INVENTOR.
Paul P. Luger,

Nov. 17, 1970 P. P. LUGER 3,541,430

DIGITAL POTENTIOMETERS MADE WITH FIXED IMPEDANCES

Filed June 13, 1966 7 Sheets-Sheet 2

INVENTOR.
Paul P. Luger
BY
TW Secrest

Nov. 17, 1970 P. P. LUGER 3,541,430

DIGITAL POTENTIOMETERS MADE WITH FIXED IMPEDANCES

Filed June 13, 1966 7 Sheets-Sheet 3

INVENTOR.

Paul P. Luger

INVENTOR.
Paul P. Luger

INVENTOR.

Paul P. Luger

INVENTOR.
Paul P. Luger

INVENTOR.

Paul P. Luger

United States Patent Office 3,541,430
Patented Nov. 17, 1970

3,541,430
DIGITAL POTENTIOMETERS MADE WITH FIXED IMPEDANCES

Paul P. Luger, 801 10th Ave., Seattle, Wash. 98122

Filed June 13, 1966, Ser. No. 562,996
Int. Cl. G05f 3/00
U.S. Cl. 323—74 55 Claims

ABSTRACT OF THE DISCLOSURE

Three types of potentiometer circuits, resistive, capacitive and inductive, are described. These devices employ fixed resistances, capacitances, and inductances together with suitable switches to combine the elements into either binary, ternary, decimal or duodecimal, or any other possible base system. The circuits may also be adapted to various types of attenuator applications. Circuits are described for the minimum possible number of reactance elements. For a selected impedance, all reactance elements are included in the working circuit, resulting in a constant, fixed impedance device. For any time of use one may select the total impedance to be employed. The resistive and inductive potentiometers are pure series circuit devices. A digital voltmeter using the novelty of the potentiometer circuits is also described.

The title of this invention is intended to apply to three closses of potentiometers, namely:

(1) Multislide-resistance multipotentiometers;
(2) Capacitance multipotentiometers;
(3) Multislide-inductance multipotentiometers.

This invention relates to resistive, capacitive and inductive devices such as resistance boxes, capacitance boxes, variable inductances and fixed attenuators; also to potentiometers, whether of the straight forward non-divider type or of the special divider type; the divider type may be either decade or, more in general, the base divider type; it also relates to variable attenuators. In addition, it is intended to encompass both bleeder network devices, capable of loading and/or dividing potential from active potential sources, such as power supplies, and also counting systems employing impedances as in digital voltmeters.

The apparatus which is the principal object of this present invention utilizes as a basic stage a combination of impedances, whether resistive or inductive, and/or capacitive, together with a switch member. A plurality of such stages are normally connected together between main terminals to form an arrangement or complex, which may be used as a resistive potentiometer or a simple resistance box device. It may also be used as a capacitive potentiometer as, for example, when two capacitors in series are placed across a potential difference for the purpose of obtaining a portion of this input potential from the common point of contact between the capacitors.

In this present invention, at the point of contact between the capacitors, which, equivalently, are two in series, one may obtain a variable potential, for, while the total capacitance is kept constant, fractions thereof are switched from one side to the other.

Therefore, this point of contact between the two equivalent capacitors will be considered the "slide contact" or the circuit of the capacitive potentiometer and it will be symbolized in drawings by an arrow that meets the line connecting the two capacitors. The two capacitors together with the arrow that meets the common connection to the capacitors may well be accepted as the symbol for a capacitive potentiometer which, because of this invention, is a new addition to the class of electrical devices called potentiometers.

This idea of a capacitive potentiometer is similar to that of a resistance potentiometer in that both devices divide potential: The word "potenti-o-meter" has the meaning "to meter or measure potential." Both have a "slide" contact that divides the input potential found across the outer terminals into portions that are measured by the switch positions and therefore by the setting of the instrument dials. "Slide" is here used in a more general sense. Although the contact does not physically slide in the conventional manner, in effect it does so equivalently because of the switching capabilities of this invention. The potentiometers described here, as a general rule, are constructed from fixed elements, either resistors, capacitors or inductors, together with switches. In addition, a suitable conventional rheostat or potentiometer of the older type, (not made from a switch and fixed impedances), or a variable inductance with a sliding contact, may be provided, but is not required.

The apparatus of this invention may also be used as an inductive potentiometer, thus functioning also as a variable potential divider. Finally it may be used as an attenuator, either fixed or variable, employing selected elements: resistive, capacitative, and inductive, together with a switch member.

A resistance or capacitance or inductance box, provided in accordance with the present invention, permits the attainment of resistance or capacitance or inductance values over a range from that of the smallest value present to the total of all values. A decimal system is often desirable but is not necessarily employed. The present switching device, to be hereafter described, is a more simple switching circuit than used previously in indefinitely long resistive potentiometers.

The novelties and improvements introduced into the switching circuits with this invention make possible the introduction of several valuable features:

(1) Use of capacitors in potentiometric systems
(2) The elimination of taylor-made switches since any of several conventional switches may now be used; for example, a manufacturer may use rotary switches, the more expensive class of instrument switches, and mercury switches.

Potentiometers of the three types described above can be manufactured with the minimum possible number of impedance elements. Furthermore, this is less than half the number of resistances in use today in equivalently competitive circuits, as, for example, the Kelvin-Varley circuit.

The potentiometers of this invention are sometimes called indefinitely long potentiometers, or simply, long potentiometers, either resistive, capacitive or inductive.

These potentiometers, made up of elemental sections may attain considerable length since matched basic units or stages are additive. Its length is well termed indefinitely long, for one may always greatly increase its length by the addition of a switch element and its associated impedances; for example, in the binary version of this invention, by adding one impedance and one switch member the length of the potentiometer is doubled.

Apparatus that may embody the present invention includes resistance boxes, capacitance boxes, variable inductances, attenuators; potentiometer combinations, including resistive, capacitive and inductive types; motor-driven or hand-operated rotating potentiometers; digital voltmeters and other devices employing impedance elements in counting circuits; skip distance potentiometer devices as well as those devices to which specific reference has been made.

Utility is found for these instruments and networks in the electrical measurement fields although they can equally well be adapted to the corresponding type of device where electrical power consumption is the factor of primary consideration. Potentiometers of the three types already described, exhibit advantage in that any load at the output end, thereof, does not impair the usefulness of the instrument since by an easy calculation, the true potential reading can be deduced. In this respect, these long potentiometers offer an advantage over the Kelvin-Varley circuit, which, in general, should not be loaded, since the equivalent resistance of a setting of the Kelvin-Varley is calculated only with the greatest difficulty.

Furthermore, Kelvin-Varley dividers are not resistance boxes; but in this invention the potentiometer may always be used as a resistance box which gives direct readings in ohms. The same is true for the other potentiometers of this invention—they may be used as capacitance or inductance boxes.

Further application for instruments made from this invention will be found in the fields of meter calibration, potentiometric voltage and current measurements using an accessory standard cell, linearity measurements, voltage ratio measurements, bridge ratio arms and rheostats, transformer measurements, precision attenuators, and precision variable resistors, capacitors and inductors.

Features of the product delivered to the customer are: several accurate voltage dividers and several potentiometers in a single unit; resistive and inductive units always provide constant input impedance in a circuit, the capacitive unit, if properly designed, may also provide this function; digital read-out insures quick, accurate setting of the device.

These and other features of the present invention render it useful in meter applications, Wheatstone bridges, capacitive bridges, circuits requiring variable grounds as in quartz fiber electrometer circuits, and in bleeder-dividing devices designed for the output of power supplies. In fact, any application where resistive, capacitive or inductive potentiometers are required to possess quick, reliable reproductibility, high resolvability, and even in circuits where the device is loaded, may successfully utilize the novelty of this invention.

In resistive, capacitive, inductive or attenuator box applications, the switch member associated with any resistance, capacitance, inductance, or attenuator device of that stage, incorporates means for including or excluding each resistive capacitative, inductive, or attenuator element of that stage from the circuit of the instrument while yet providing for the application of power to a succeeding stage through the switch member.

In addition, in resistance or inductance potentiometer applications, the switch member associated with any resistive or inductive element of any stage provides for the inclusion or exclusion of any resistive, or inductive element from the first traverse of the power through that circuit, and then, the exclusion or inclusion of the element, as the case may be, on the second traverse through the stage, thus providing for the positioning of the element in one or the other of the two traverses of the power through that switch member. In capacitive potentiometers, the switch member provides for the connection of one end of each capacitance to either of two switch terminals at each switch position; it may also provide that the other end of each capacitance be connected to a third switch terminal if connection is not provided through a permanent common connection. The common connection may be selected for capacitors that are not polarized; a third switch terminal is required for the polarized capacitors.

The multi-aspects of the various potentiometers referred to by the names multislide and multipotentiometer will now be described.

The name multipotentiometer is meant to indicate that a long potentiometer of this invention, made from two or more elemental potentiometers, may be designed to operate as two or more potentiometers, thereby constituting a multipotentiometer. Thus, one may select the total impedance to be employed at any given time. This selection may be made by a selector switch or simply by bringing out a pair of terminal connections from each elemental potentiometer for external, manual connection. It will be appreciated that this feature multiplies the utility of the potentiometer device of this invention; for as a general rule, among currently available potentiometers, one cannot be substituted for the other if they differ by one, or more than one order of magnitude.

One must distinguish the smallest selectable impedance which is that associated with the smallest number which can be dialed on the potentiometer, and the increment which is determined by the base of the couting system employed.

In a strict binary system the increment for each order of magnitude is an increment which at each stage doubles the impedance of the previous stage but in the decimal system increases by a factor of ten. In a duodecimal system the increase would be by a factor of twelve at each stage. Octol, or any other counting system can be designed into the basic switch member of this invention. Indeed every counting system from the binary and upward may be adapted for use with this invention; and, an increment of one order of magnitude, determined by the base of the counting system employed, is added as each elemental potentiometer (or basic switch) of higher magnitude is added to the system.

The multipotentiometer aspect of this invention may be utilized for capacitance potentiometers by employing an auxiliary switch to select the total capacitance of the potentiometer. In effect, the auxiliary switch will be connected so as to isolate the more significant switch members; or this may be done by adding a switch position to those switches where isolation may be desired. The extra switch position has unconnected contacts which isolate the capacitors of the switch member from the power terminals on its switch.

The multisiled aspect of this invention is found in using more than one "slide contact," permitting more than one terminal to function as a "variable slide" as when one taps off from a bleeder resistor at several places. Although there is only one principal slide that enjoys perfect contactability with all positions along the equivalent series impedance, other intermediate IN and OUT contacts of intermediate stages afford a true but limited slide effect within its range in steps of the smallest impedance contained within the switching member or members where it is connected. However, these "slides" are to be considered secondary in that they enjoy only limited contact, unlike the main slide which can be placed at any position along the potentiometer with full resolution—which in turn is fixed by the magnitude of the smallest impedance element. In general one should first determine the accuracy required for the main slide. If accuracy requires all dial settings, then all slide contacts will be fixed. They may or may not be useful for some applicatiton. But if only the most significant dial is required for setting the main slide, then, one may use the first terminal as the main slide, and proceed in steps to utilize other less significant dials and their terminals until one has finally adjusted the least significant potentiometer position. The multislide feature is found only on resistive and inductive potentiometers.

The invention will be more fully understood by reference to the following detailed description and accompanying drawings wherein.

Figure 3:
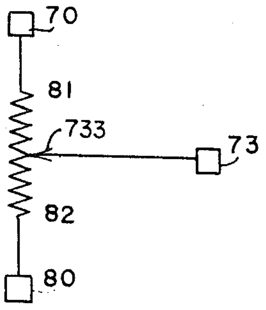
FIG. 3 is an equivalent circuit for a development of FIG. 1 or 2, showing a three-terminal potentiometer.
Figure 9:
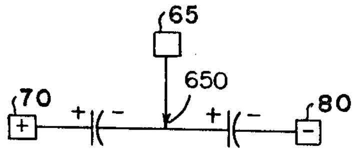
FIG. 9 is an equivalent circuit for a development of FIG. 8.
Figure 14:
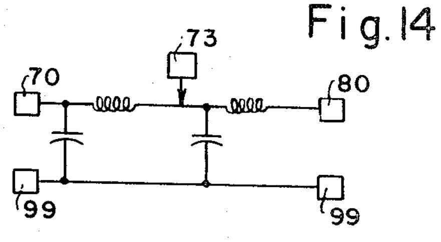
Figure 15:
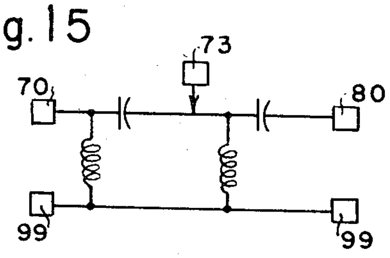
Figure 16:
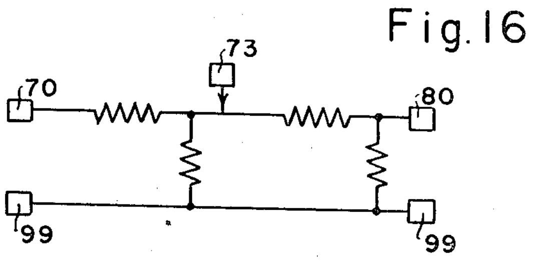

FIGS. 14, 15, and 16 are potentiometers after the fashion of FIG. 3 or FIG. 9 to which are added impedance elements connecting to a third common terminal.

Figure 17:
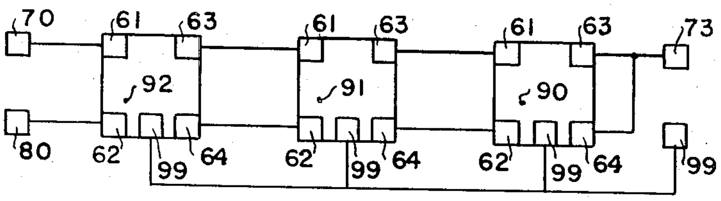

FIG. 17 shows the interconnection of three elemental attenuator sections like those depicted in FIG. 14 or FIG. 16.

Figure 18A:
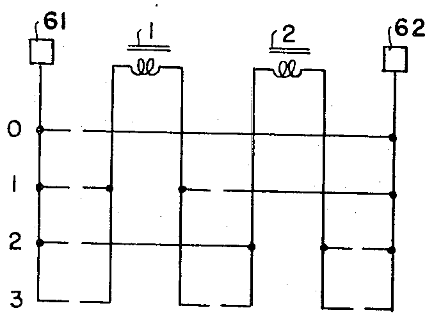
Figure 18B:
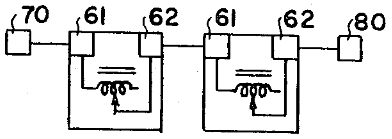
Figure 18C:
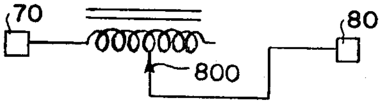

FIGS. 18A, 18B, and 18C show an elemental half-potentiometer for a quartal counting system and an interconnecting circuit and an equivalent circuit respectively.

Figure 19A:
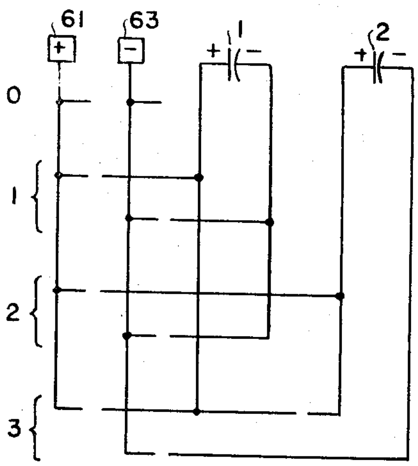
Figure 19B:
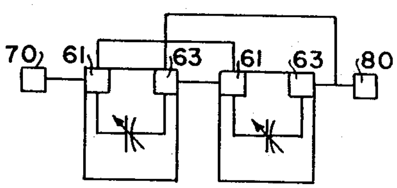
Figure 19C:
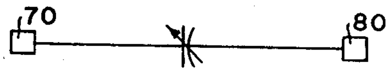

FIGS. 19A, 19B, and 19C show another elemental half-potentiometer for a quartal system together with an interconnecting circuit and an equivalent circuit respectively.

Figure 20:
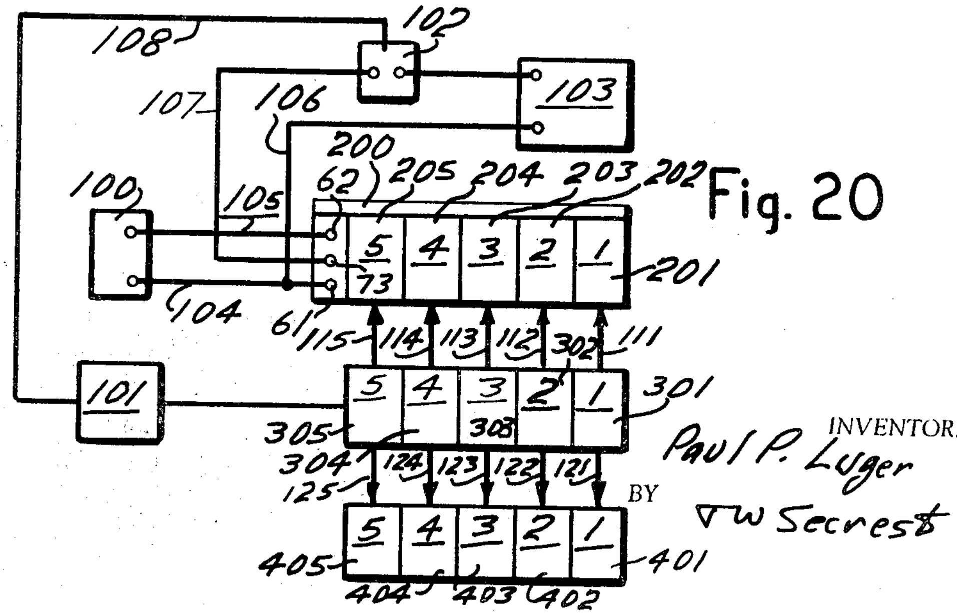

FIG. 20 shows the use of the invention in a digital voltmeter circuit.

Figure 1:
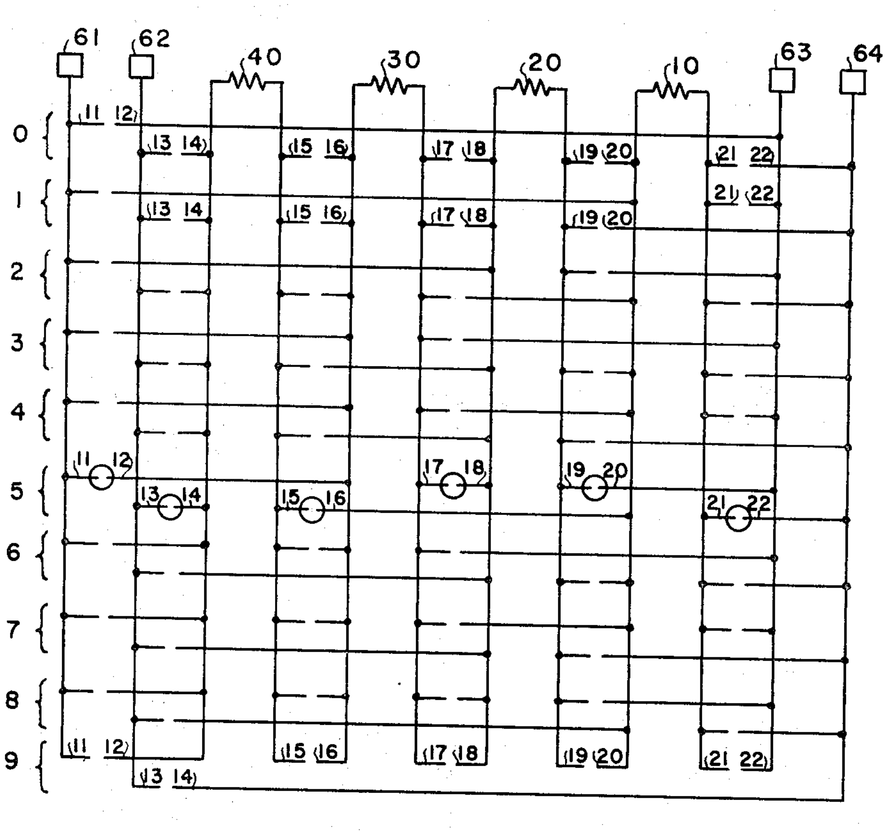
FIG. 1 is a circuit diagram of an arrangement embodying the invention and particularly illustrating an elemental resistive potentiometer for a decimal system.

Turning now to FIG. 1, there is illustrated a basic switching device, for an elemental resistive potentiometer. It is designed for a decimal system. It is shown to have ten positions, zero through nine, designated by the numbers on the left. There is illustrated for each switch position a plurality of switch contact pairs, 11, 12, through 21, 22, may, for convenience in understanding the invention. The contact pairs are not designated for each switch position, but could be referred to by the same numbering sequence. The circles in position five encircling the contact pairs 11, 12 through 21, 22, represent ganged movable contacts constrained to move in the vetrical direction together to effect the closed or "ON" position of the switch. It is understood, however that of the contact pairs in FIG. 1 (and so also in succeeding figures showing contact pairs) one contact is fixed and one is movable. The movable contact is common to other switch positions and moves (up and down in the diagram) to make contact with the fixed members of other switch positions. Each switch may have only one "ON" position at a given time. There is a plurality of resistances, 10, 20, 30, and 40. There are also shown two pair of main power terminals, 61, 62, 63, and 64. Terminal 61 is the "IN" or entrance terminal; terminal 62, the "OUT" terminal; terminal 63, the "TO" terminal, and terminal 64, the "FROM" terminal.

Usually this basic elemental potentiometer is connected together with other similar potentiometers that have cooperative resistance values to form a long potentiometer. If we suppose this switch is neither the most or least significant portion of a decimal system, then its "IN" and "OUT" terminals are connected to the "TO" and "FROM" terminals respectively of the next most significant decimal switch. The "TO" and "FROM" terminals are connected respectively to the "IN" and "OUT" terminals of the next lower switch section.

If the unit just described serves as the least significant decimal position, the "TO" and "FROM" terminals, 63 and 64 are connected together and serve as the "SLIDE" terminal for the potentiometer or as the "OUT" terminal for a resistance box use of the device.

It will be noted that for each position of the switch there are two horizontal lines, which are broken or interrupted at several places indicating the contact pairs, 11, 12, etc., previously described. In general, the top line of the pair connects the "IN" and "TO" terminals; whereas the lower line connects the "FROM" and "OUT" terminals. These connections are made to the resistance elements by the associated switch contacts, the contacts serving to isolate the various elements for switch positions not in use.

The design pattern of the elemental potentiometer unit should now become apparent. Let us suppose that resistances 10, 20, 30 and 40 are one ohm, two ohms, three ohms, and another three ohms, respectively. For the zero position, no resistance is connected between the "IN" and the "TO" terminal; all resistances are connected between the "FROM" and "OUT" terminal. For the ONE position, the one ohm resistance is connected between "IN" and "TO" terminals; while the two ohm and the two three ohm resistances are connected between the "FROM" and "OUT" terminal. For the five position, five ohms are connected between the "IN" and "TO" terminals and four ohms between the "FROM" and "OUT" terminals. It is clear how the switch might be based on other resistance ratios, such as a 1, 2, 2 and 4, or a 1, 2, 4 and 5 ratio basis and also be connected as to produce a continuous counting system.

Figure 1A:
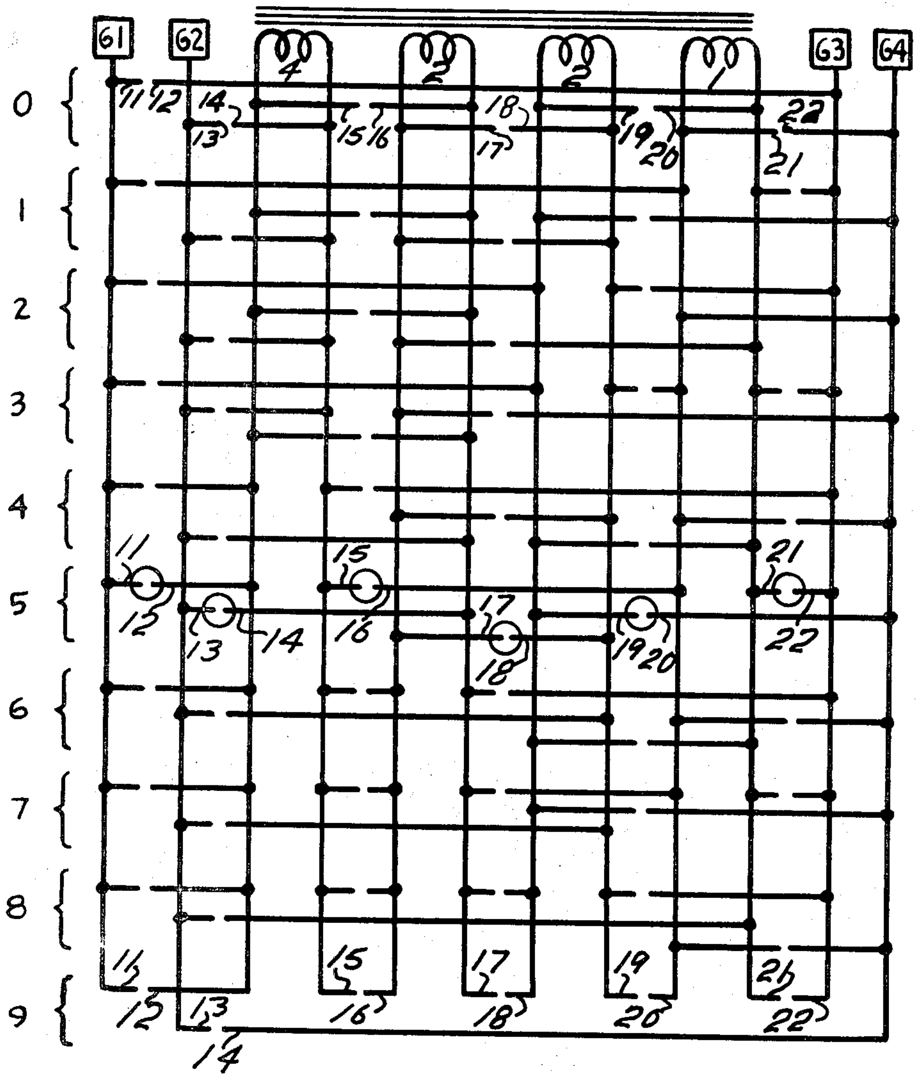
FIG. 1A is a circuit diagram of an arrangement embodying the invention and particularly illustrating an elemental inductive potentiometer for a decimal system.

FIG. 1A illustrates a basic switching device for an elemental inductive potentiometer. It is designed for a decimal system. It is shown to have, therefore, ten positions, zero through nine, designated by the numbers on the left. Here also is illustrated for each switch position a plurality of switch contact pairs, 11, 12 through 21, 22. Contact pairs are not designated for each switch position, but could be referred to by the same numbering sequence. The circles in position five encircling the contact pairs 11, 12 through 21, 22, represent ganged movable contacts which may be thought of as if constrained to move in the vertical direction together to effect the closed or "ON" position of the switch. It is understood however that of the contact pairs in FIG. 1A, one contact of each pair is common to all switch positions and is moved in the switch to make contact with the fixed member of the pairs. There is a plurality of inductances 1, 2, 2, 4 shown as wound on a common core. The numbers 1, 2, 2 and 4 are descriptive of the ratio turns of these inductances. In FIG. 1A they are wound in the same direction. The direction of winding must be taken into account in wiring the switch. There are also shown two pair of power terminals, 61, 62, 63 and 64, as described for FIG. 1. Usually, this basic elemental inductive potentiometer is connected together with other similar units that have cooperative inductive values to form a long potentiometer as described for FIG. 1. The main difference being that the impedance elements are inductive rather than resistive. Such potentiometers have such low resistive values that they become ideal for dividing alternating current potentials.

In connecting the inductances to the switch of FIG. 1A, the contact pairs. 11, 12 etc., previously described will be connected at each position so that the inductive values at 1, 2, 2 and 4 of FIG. 1A will count from position zero through 9. Suppose 1, 2, 2, and 4 represent for FIG. 1A inductance values in henries. For the zero position no inductance is connected between the "IN" terminal at 61 and the "TO" terminal at 63; while all the inductances are connected between the "FROM" terminal at 64 and the "OUT" terminal at 62. Note however, if the direction of the winding of each inductance is to be additive the current must traverse the windings so as to produce an addition not a subtraction of flux due to a given winding. In like manner as in FIG. 1 at each position of the switch in FIG. 1A the value of the inductance in henries corresponding to the switch position must be connected between the "IN" and "TO" terminals while the remainder of the inductances are to be connected between the "FROM" and "OUT" terminals, always observing the current direction of flow through each inductance so that the switch position value reflects the true value of inductance. FIG. 1A shows the connections and directions required under the supposition that all inductances are wound in the same direction around the common core. It is evident that each inductance may have its own core and be isolated from the others.

Figure 2:
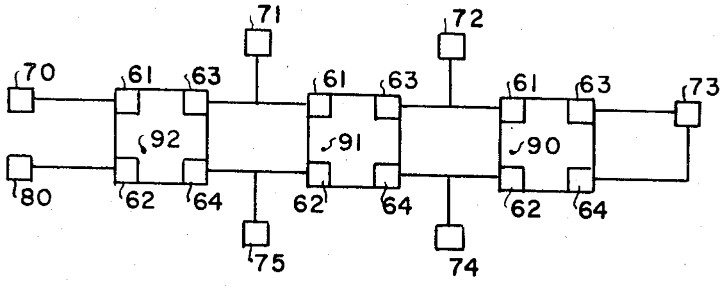
FIG. 2 illustrates schematically a wiring diagram together with main terminals for the interconnection of three elemental potentiometers, like that of FIG. 1, to form a multipotentiometer.

FIG. 2 shows how three basic elemental potentiometers, 90, 91, and 92 may be connected together to form a three-place resistive potentiometer, the "IN," "OUT," "TO," and "FROM" terminals are designated by 61, 62, 63 and 64 respectively. The main "IN" and "OUT" terminals, 70 and 80, are shown connected to the most significant potentiometer (or switch), 92. Intermediate terminals, 71, 72, 74 and 75 may also be brought out to the potentiometer panel to be employed if the potentiometer is used as a multislide device or as a multipotentiometer. The potentiometer of FIG. 2 may be used as a multipotentiometer, for example, employing as main "IN" and "OUT" terminals either 70 and 80 or 71 and 75 or 72 and 74.

Figure 2A:
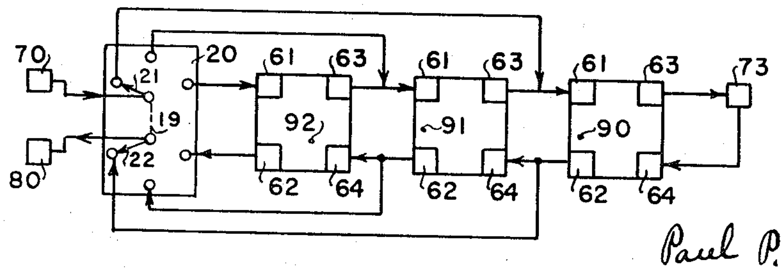
FIG. 2A is the same as FIG. 2 except that the main terminals are brought through a selector switch.

FIG. 2A shows how a selector switch 20 may be employed to select the elemental potentiometers. The main "IN" and "OUT" terminals 70 and 80 may be connected so as to use only elemental potentiometer, 90, or to use 90 and 91 together or to use all three of the elemental potentiometers as one unit. Movable contacts, 21 and 22, may be operated in ganged fashion or individually if a greater selection of total resistance is desired. A mechanical link, 19, is shown dotted, indicating ganged contact usage.

FIG. 3 is an equivalent circuit for the potentiometer shown in FIG. 2. Here the total resistance is the sum of all resistances controlled by potentiometer units 90, 91 and 92 of FIG. 2. In FIG. 3, resistance 81, together with resistance 82, is the total resistance of the potentiometer. The value of resistance 81 is selected by the switches 90, 91, and 92. The sum of 81 and 82 less the dial reading will always equal the value of resistance 82.

FIG. 3 also illustrates a conventional potentiometer. A conventional potentiometer is a three terminal device with a slide contact sometimes called a glide or glider designated by the head of the arrow, 733. A variable inductance is shown in FIG. 18C. It is a three terminal inductance and has a slide contact. This slide contact is sometimes called a glide or glider shown at 800. Only two of the terminals of the variable inductance are shown connected to terminals.

Figure 4:
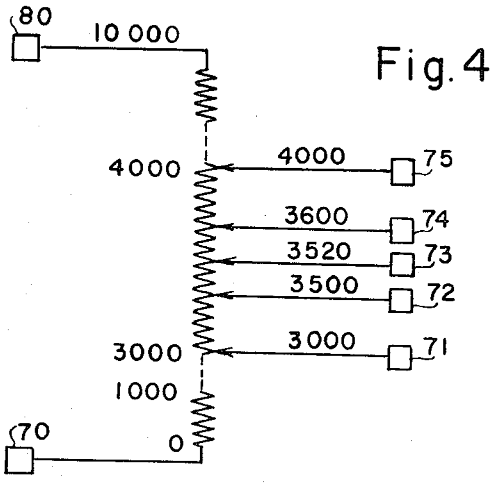
FIG. 4 is an equivalent circuit for FIG. 2 illustrating the multislide features of this multipotentiometer.

FIG. 4 is another equivalent circuit for FIG. 2 showing how binding posts 70 to 80 are connected for a dial setting of 3520.

In the diagram we are supposing that elemental potentiometer 90 has a total resistance of 100 ohms, elemental potentiometer 91, a total of 900 ohms and elements potentiometer 92, a total of 9,000 oms. Together they have a value of 10,000 ohms. If one desires a 100 ohm potentiometer, he would use terminals 72 and 74 of FIG. 2 (or FIG. 4) as "IN"-"OUT" terminals, with terminal 73 as the slide. For a 1,000 ohm potentiometer he would use terminals 71 and 75 with terminal 73 as the slide. Finally, he would use terminals 70 and 80 with slide 73, for a 10,000 ohm potentiometer.

In this last case one may use terminals 71 to 75 as multislide terminals. There are restrictions, however, which must be kept in mind. It the main slide requires the setting of switches 90, 91, and 92, then resistances between terminals are all fixed and the multislides cannot be adjusted further. However, if the main slide requires only one place of read out (or only two), then there is some adjustment available.

Suppose, then, that the main slide requires only one place of adjustment, then switch 92 may be set to this value. FIG. 4 shows the switch set at 3000 ohms. (One may now consider terminal 71 as the main slide.) Then one proceeds to set the other dials as required, fixing the potential for terminal 72 and then 73. This will also fix the potential at terminal 74 and 75.

FIG. 4 shows how multislides are spaced along a span of one-tenth the magnitude of the most significant dial used. It is necessary to keep this fact in mind in assessing the multislide utility for an application. With a five or six place potentiometer across a fittingly selected potential, the multislide feature of this device will afford a considerable span of smaller but often useful potentials. What has been described in FIGS. 2, 2A, 3 and 4 for the resistive potentiometer may also be applied, MUTATIS MUTANDIS, to the inductive potentiometer. It should be remembered that for inductances wound on the same iron core, care must be taken that current directions are taken into account. Current in the same directions are additive of inductance while currents in reversed directions become subtractive.

It should also be clear that an inductive potentiometer made from fixed inductors, as described in this invention, may be used in conjunction with a conventional inductor, which has a moving glider or slide. This would normally be connected to the least significant section of the inductive potentiometer, and the slide of the conventional inductor would serve as the slide for the long potentiometer which may be composed of several elemental potentiometers described in this invention.

A variac exemplies a conventional inductor with moving glider. It would be required, however, that for this application the slide contact of the variac be limited to positions along the inductance between the input and output terminals, and that the inductance of the variac be matched to the elemental potentiometer to which it connects.

Figure 5:
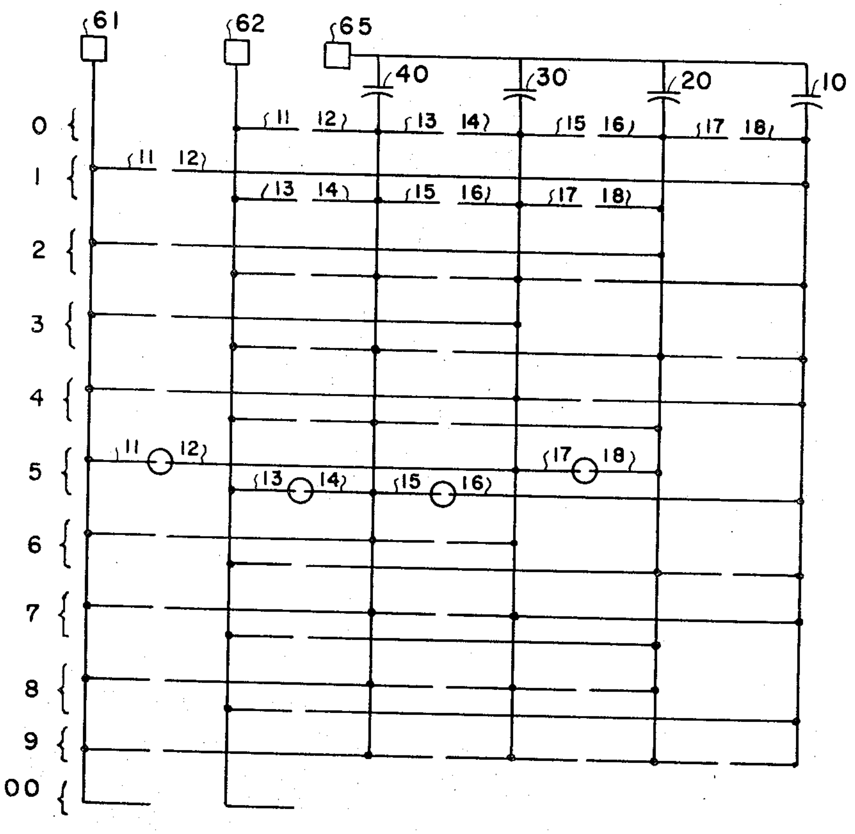
FIG. 5 is a circuit diagram of an elemental capacitive potentiometer embodying the invention.

Let us turn now to FIG. 5. Here is shown a basic switch and circuit constituting an elemental capacitive potentiometer. It employs a decimal system. The switch has ten positions, 0 through 9, designated by numbers on the left. Here also for each switch position is designated a plurality of switch contact pairs, 11, 12 through 17, 18. The contact pairs are only shown for switch positions zero and one. The other switch positions, 2 through 9, follow the same numbering sequence. The circles in position 5 are used solely to illustrate an "ON" position. It is understood that the contact pairs represent one fixed and one movable contact. The latter moves in the switch and is common to all the fixed contacts that it reaches. Each switch may have only one "ON" position at a given time. There are four capacitors, 10, 20, 30 and 40. There are three terminals, an "IN" terminal, 61, and an "OUT" terminal, 62, together with a "SLIDE" terminal, 65. The slide terminal is connected to one side of capacitors 10, 20, 30, and 40 as shown. This elemental potentiometer is designed for non-polarized capacitors.

In this circuit it will be noted that for each switch position, excepting 0, 9 and 00, there are two horizontal lines, interrupted at various places, indicating the open contact pairs previously described. For switch positions 0, 9 and 00 there is shown only one such horizontal line. In general, one line connects to the "IN" terminal, 61, whereas the other line connects to the "OUT" terminal, 62, when the switch is closed at a particular position. Let us suppose that capacitors 10, 20, 30 and 40 are 10, 20, 30 and 30 farads respectively. The circuit connects the "IN" terminal to appropriate capacitors for each position of the switch. Capacitors which are not connected to the "IN" terminal are connected to the "OUT" terminal for each switch position. No capacitance is connected to the "IN" terminal for the 0 switch position; for the 9 position all capacitances are connected to the "IN" terminal. The 00 position is seen to isolate all capacitances from the "IN" and "OUT" terminal.

Figure 8:
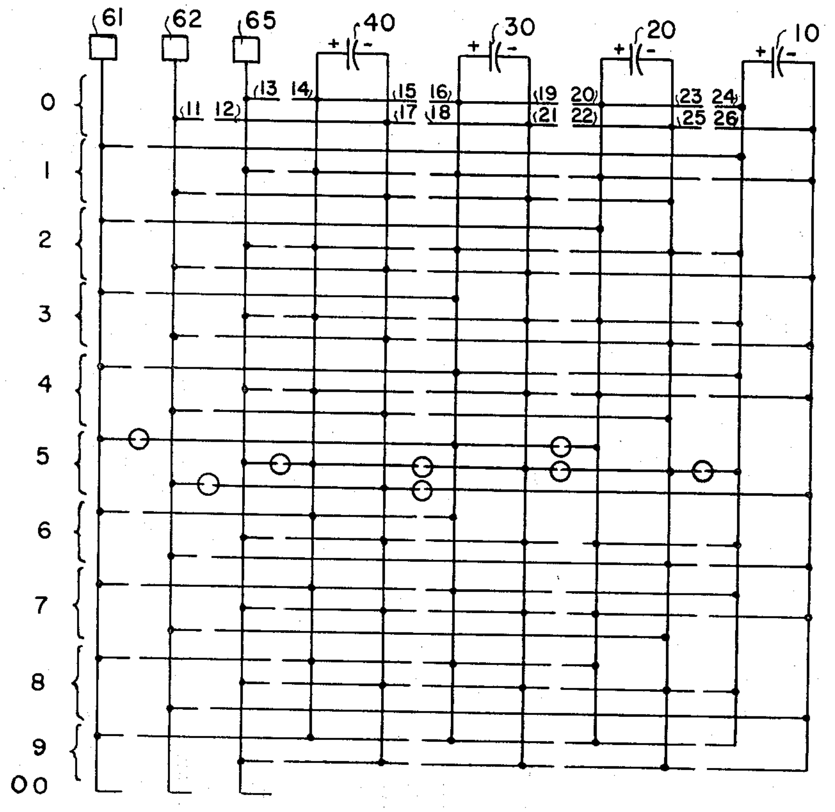
FIG. 8 is a circuit diagram of an elemental capacitive potentiometer embodying the invention to employ capacitors, i.e., electrolytic capacitors.

FIG. 8 is an elemental potentiometer designed for electrolytic capacitors. It will be noted that it employs a third horizontal connector line for each position of the switch. This is necessary to maintain the correct polarity. FIG. 9 shows the equivalent circuit for the electrolytic capacitative potentiometer of FIG. 8.

Table I gives an array of information regarding counting system and relates them to use in this invention. Listed in the first column is the base of each counting system. The name of the counting system is shown in column two. Some systems are not named but may be referred to by giving the base of the system, as, for example, the base 16 system. In column three, the minimum number of resistive, capacitive or inductive elements required to count through a single magnitude is shown for each system. This is also the minimum number of impedances per switch, i.e., per elemental potentiometer.

TABLE I.—COUNTING SYSTEMS FOR THE POTENTIOMETERS

| Base of system | Name of system | Minimum No. of impedance elements per switch | A set of impedance element ratios for use as base divider | Rating for use with the potentiometer | Minimum number of switch positions per switch for resistance potentiometer |
|---|---|---|---|---|---|
| 2 | BINARY | 1 | 1 | ** | 2 |
| 3 | TERNARY | 2 | 1, 1 | * | 3 |
| 4 | | 2 | 1, 2 | ** | 4 |
| 5 | | 3 | 1, 1, 2 | * | 5 |
| 8 | | 3 | 1, 2, 2 | * | 6 |
| 7 | | 3 | 1, 2, 3 | * | 7 |
| 6 | OCTOL | 3 | 1, 2, 4 | *** | 8 |
| 9 | | 4 | 1, 2, 2, 3 | * | 9 |
| 10 | DECIMAL | 4 | 1, 2, 3, 3 | *** | 10 |
| 11 | | 4 | 1, 2, 3, 4 | * | 11 |
| 12 | DUODECIMAL | 4 | 1, 2, 3, 5 | **** | 12 |
| 13 | | 4 | 1, 2, 3, 6 | * | 13 |
| 14 | | 4 | 1, 2, 4, 6 | * | 14 |
| 15 | | 4 | 1, 2, 4, 7 | * | 15 |
| 16 | BASE 16 SYSTEM | 4 | 1, 2, 4, 8 | **** | 16 |
| 17 | | 5 | 1, 2, 2, 3, 8 | * | 17 |
| 18 | | 5 | 1, 2, 3, 3, 8 | * | 18 |

Figure 5A:
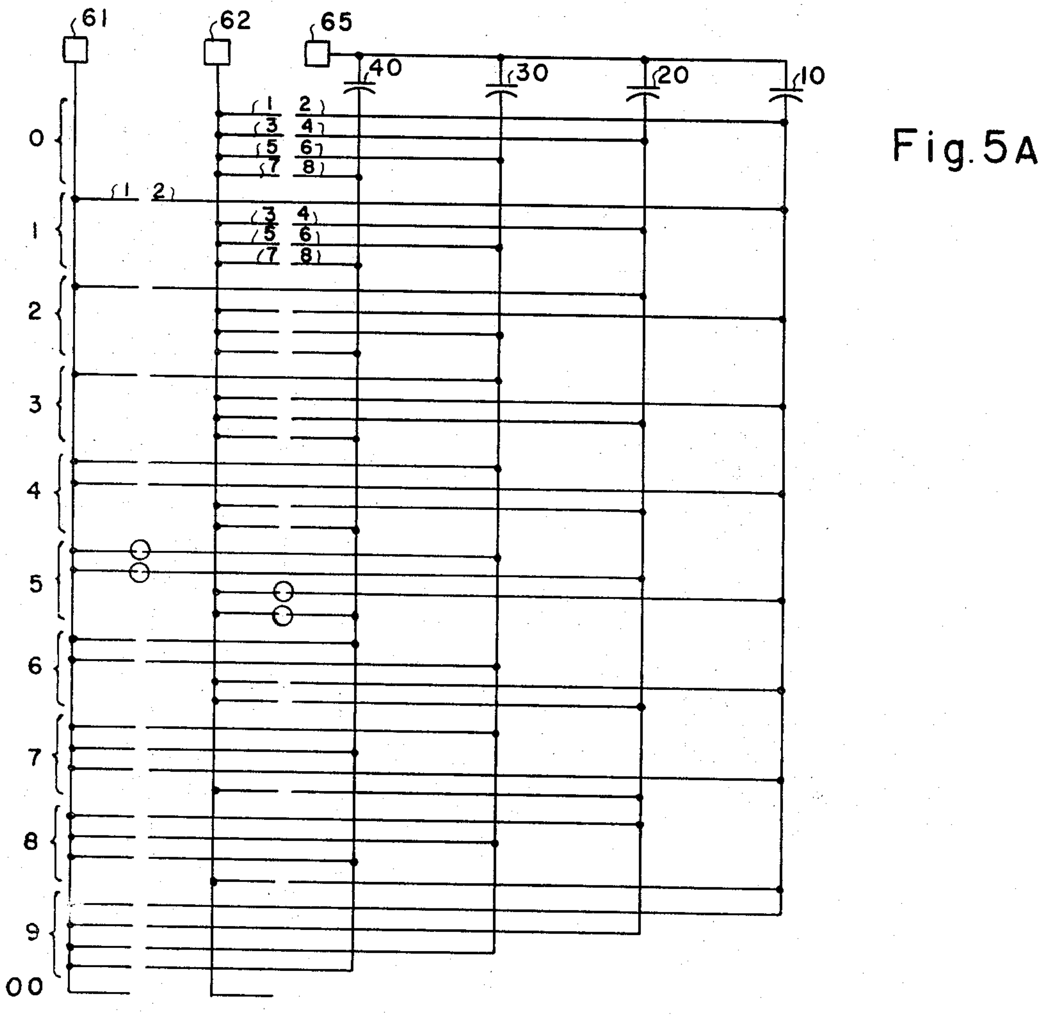
FIG. 5A is another circuit diagram illustrating an alternative arrangement for an elemental capacitive potentiometer.

FIG. 5A is equivalent to FIG. 5 except for the scheme employed of connecting the capacitive elements. In FIG. 5A one side of each capacitor is directly connected either to the "IN" or "OUT" terminal for each switch position save position 00.

Figures 6, 7:
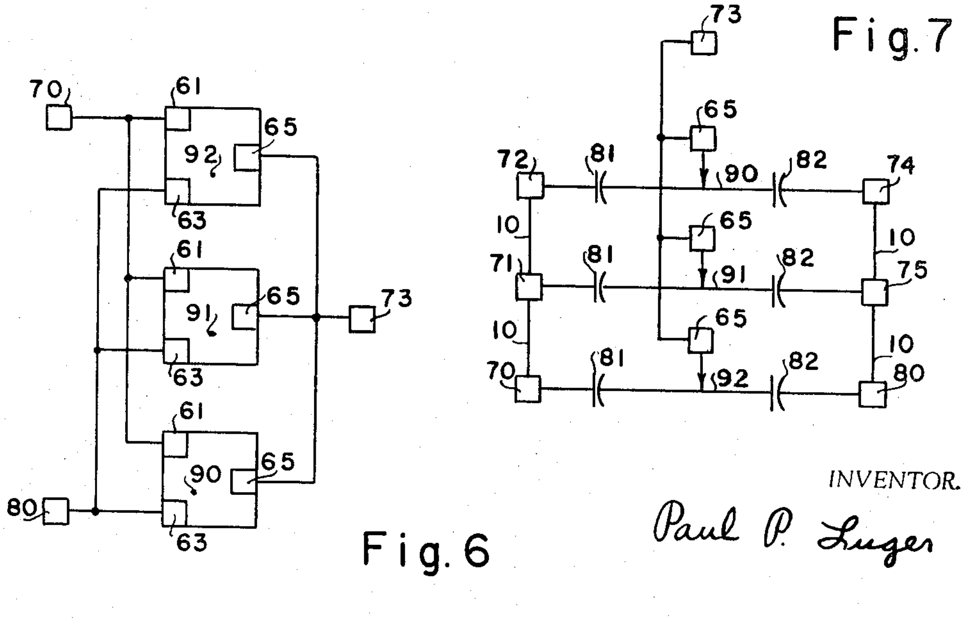
FIG. 6 illustrates the interconnection of three elemental capacitive potentiometers into a three-terminal device.
FIG. 7 is an equivalent circuit for the development of FIG. 5 or FIG. 6 as a capacitance multipotetiometer.

FIG. 6 shows how several capacitive elemental potentiometers may be connected together to serve as a long potentiometer. It will be noted that these basic potentiometer units, 90, 91 and 92, are so connected that the main "IN" terminal, 70, is connected to the "IN" terminals, 61 of switches 90, 91 and 92. Likewise, the main "OUT" terminal, 80, is connected to the "OUT" terminals, 63, of all the elemental potentiometers, 90, 91 and 92. In similar fashion the individual slide terminals 65, are interconnected to the main slide terminal, 73.

FIG. 7 is both an equivalent circuit for FIG. 6 and shows how the switch terminals may be brought out from the elemental potentiometers to make a multipotentiometer. (Not to be confused with the long potentiometer.) If poentiometers 90, 91 and 92 have a switch position, 00 (see FIG. 5), which permits the isolation of switch capacitances and switch terminals, it will suffice to bring to the face of the instrument terminals 70, 73 and 80. Otherwise, the terminals shown in FIG. 6 should all be brought out and connections 10, between terminals should be made externally, so as to employ only those multipotentiometer sections that are desired. For example, if elemental potentiometer 92 is set to its 00 position, it is then separated from the elemental potentiometers 91 and 90 and also from the main "IN" and "OUT" terminals, 70 and 80. It should be clear then for this use of the instrument as a capacitive multipotentiometer, one may use the switch units 90, 91, or 92 either separately or in combination. If the units are connected as shown in FIG. 7, whatever value is set on the switch dials will appear between terminals 70 and 73; the difference between this value and th total potentiometer capacitance will appear between terminals 73 and 76.

It is clear that one could design a switch with more than the minimum number of impedance elements and utilize the novelties of this invention. For some applications this may prove advantageous.

Let us take as an example a decimal system. If one goes to the other extreme and takes a maximum number, let us say, of resistive impedances, then for a count through one magnitude we might use 9 resistances per switch, suppose the range is from one through nine, such an arrangement would only require a two-pole ten-position switch, in general; but the saving in switch would go into the cost of resistances. A design like this could also be a decade divider, but then one would not use all resistances at each switch position. If one wished to utilize all of the impedance values at each switch position one would need to increase the poles on the switch. To use all resistances it would require an 11-pole, 10-position switch. Instead of an increase of 9 ohms in the units switch of a decimal system, the increase would be 45. In the tens position the resistance increase would be 450 ohms instead of 90. However, this system could not be used as a decade divider. This discussion would also apply to inductive impedances.

In column four of Table I impedance values are given for the "units" position for potentiometers of this invention intended for use as decade dividers. In saying decade divider, we are really speaking of a decimal system. A decade divider is a special potentiometer capable of dividing a potential placed across its terminals into decimal parts. This requires for a decimal system that the total impedance is 9, 90, 900 and 9,000, etc. as one goes from the units place to the higher tens, hundreds and thousands places.

The values in column four are therefore ratios of values which may be employed on decade dividers or more generally "base" dividers if we wish to use a name to include all counting systems.

Column five in Table I gives a rating of the utility of the various counting systems in respect to their desirability for use with this invention. The base 16 system enjoys several advantages.

Finally, column six gives the number of switch positions per switch required for resistance potentiometers designed as base dividers for the counting systems shown.

Figure 10A:
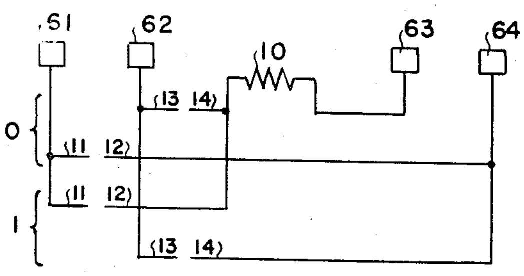
FIG. 10A is a circuit diagram of a binary application of the invention.
Figure 10B:
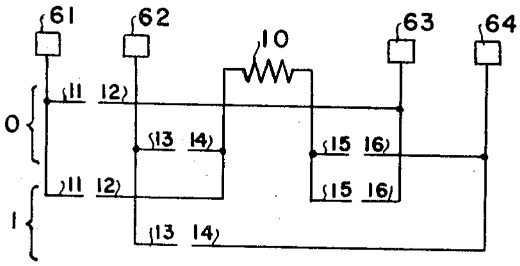
FIG. 10B is a circuit diagram of a preferred binary application of the invention.

As an example of a system other than the decimal, consider the binary system. FIGS. 10A and 10B show two circuit diagrams; the "IN" and "OUT" terminals are indicated by numbers 61 and 62 respectively; but only for FIG. 10B are terminals 63 and 64 the "TO" and "FROM" terminals, respectively. FIG. 10A has the drawback of effecting a reversal of current direction for the 0 and 1 switch positions. Thus for the 0 position, terminal 64 is the "TO" terminal and for the 1 position, terminal 63 is the "TO" terminal. This drawback is remedied in FIG. 10B through employment of two additional switch contacts. The present invention makes a simple rotary switch useful for use with the binary system and eliminates an additional switch and its SIX contacts, as was formerly required when DPDT toggle switches were employed.

It should be pointed out that the base 16 system combines many advantages over other systems. Although the base of the base 16 system is not divisible by as many factors as is the base of the duodecimal system, its base is divisible by more factors than that of the decimal system. As can be seen from Table I, column 4, the base 16 system is composed of a binary progression of ratio values (1, 2, 4, 8) permitting the minimum number of impedance values to increase at a maximum rate at each magnitude of counting. (A magnitude permits one to count through a number equal to the base of the system.) This permits a potentiometer using these ratios to also function as a base divider and at the same time to increase in impedance magnitude at a maximum rate as one ascends to higher magnitudes. The base 16 system, therefore, is more desirable for use with this invention and may also prove very desirable in computer or calculating systems. In a similar fashion, a base 32 or a base 64 system may prove even more advantageous. For some applications these systems enjoy the advantages of the simple binary system.

This invention has application in situations where it is desirable to economize or minimize on impedance elements. This occurs basically in counting or measuring circuits such as are found in computers and digital voltmeters.

In the digital voltmeter application of this invention, a voltage is maintained across a potentiometer constructed from fixed resistances. (The voltages, of course, might also be maintained across capacitive or inductive potentiometers.) An unknown voltage, to be measured, is applied across the potentiometer, i.e., between the slide contact and a potentiometer terminal in such a way that the two voltages will buck one another. The slide is then positioned until the two voltages are equal as sensed by a null detector in the conventional manner. At the point of balance the pulse generator is shut off and the voltage is displayed in digital fashion or it may be recorded.

Economy of hardware suggests the binary system for the construction of the potentiometer. This is done by connecting together elemental potentiometer sections as described earlier. The number of elemental potentiometers to be used will be determined by the largest voltage to be measured. The switch contacts must be closed for those switch positions throughout the entire potentiometer where the two voltages are equal as indicated by the null indicator. The potentiometer, of course, will be composed of many units comprised of resistors and switch contacts as shown in FIG. 10B.

In the digital voltmeter the contacts are not controlled by manual switching, but rather by solid state or vibrating reed or mercury relay-type switching. In order to find the point of balance for the null indicator, a pulse generator is used to drive a counter which in turn closes the contact points for the proper positioning of the impedance elements of the potentiometer. In other words, the potentiometer is driven by the counter to the point of balance. At this point a conversion is made from binary to decimal, by methods well known to the art, for displaying or recording the voltage reading indigital, decimal fashion.

This invention effects both a saving in impedance elements as well as in the number of contact points which must be manipulated by the counter that drives the potentiometer. This economy therefore reflects savings in impedance units, as well as in transistors, relays and the associated electronics.

Figure 11:
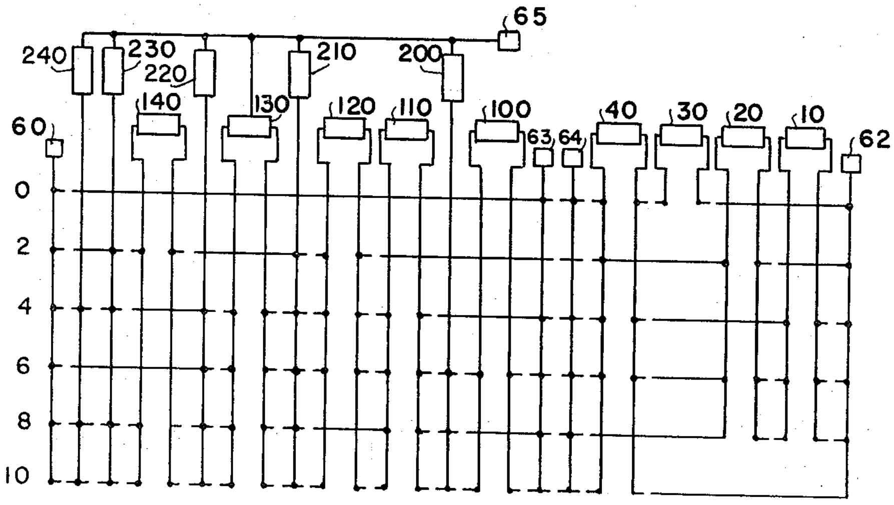
FIG. 11 is a circuit diagram of an attenuator section combining switching features of both the resistive and capacitive potentiometer types.

FIG. 11 shows a circuit diagram for an adjustable attenuator. Impedance networks indicated by the box diagrams as the 100 series and the 200 series comprise selected values of resistance and/or inductance and/or capacitance. The diagram is intended to demonstrate and also to symbolize how the switch arrangement of this invention might be applied to many different combinations of impedance networks.

In Table II there are listed various functions that employ combinations of L, C, and R where application may be found for the principles of this invention. The functions are listed in column 1, whereas in columns 2 and 3 are listed the appropriate values of L, C and R for the 100 and 200 series impedance networks shown in FIG. 11. It should be noted that the 100 and 200 series networks may represent a single value of L, C and R or various combinations of them. It should also be noted that 100 series networks are arranged, in general, in series, whereas 200 series are in parallel. The number of circuits employed depends upon the specific application. The present purpose is to show how the switch design of this invention may be applied in a continuous counting system, (1, 2, 3, 4, 5, etc.), as described previously for the various potentiometers, or in a non-continuous system, (1, 2, 5, 9, 16, etc.), to any adjustable device whose purpose or function may be varied under one aspect or another.

For example, an attenuator is a device which has a constant fixed impedance, but in general, is made up of various elements of L and/or C and/or R. One example of an attenuator is the Kelvin-Varley circuit. An attenuator may be constructed entirely of resistances, and often enough these are the principle elements involved; the attenuator is usually a three-terminal device, one terminal of which, is common to the input and output ends. Attenuators may be either fixed or variable. A filter may be considered a fixed attenuator. Usually a filter is designed to suppress certain frequencies and to pass others. Those frequencies which are attenuated may be cut to as little as two decibles; or they may be limited to any predetermined level. Another function sometimes preformed by the attenuator is that of dividing down the input signal potential. This means, in the case of a filter attenuator, to divide down the potential of those frequencies passed by the filter after the fashion of potential dividing potentiometers.

Now there are several applications to the general field of filters to which this invention may be directed:

(1) Band-pass filter, with variable attenuation in the band, (2) A band-elimination filter with variable attenuation for some pderetermined band, (3) Variable attenuation for a low-pass filter, (4) Variable attenuation for a high-pass filter, (5) Low-pass and high-pass filters for which the cut-off frequency is adjustable, (6) Band-pass filter in which the upper or lower limit of the band is adjustable—or both are adjustable, (7) Flters of types 1–6 in which the output potential is varied, and (8) A filter in which the band-pass or band-elimination property may be switched to another section of the frequency spectrum.

TABLE II

| Function | Series 100 | Series 200 |
|---|---|---|
| Oscillator | L | C |
| Low Pass Filter | L | C |
| High Pass Filter | C | L |
| Band Pass Filter | (1) | (2) |
| Band Stop Filter | (2) | (1) |
| DC Filter | R | C |
| Attenuator | (3) | C |
| Do | R | R |
| Integrator | C | R |
| Differentiator | R | C |

[1] L and C in series.
[2] L and C in parallel.
[3] R and L.

For calculating the individual components of the numerous types of complex filters in use today, computer techniques have become an indispensable tool. But with the advent of this tool, many of the applications just mentioned come within easy reach. For the most part, the various filter sections made from capacitor and inductor elements are fixed systems adapted to particular bands and fixed levels of attenuation. By adding the necessary computer selected sections and by employed the switching techniques of this invention, various types of attenuators can be designed.

One may note that for applications 1–4 and 7 mentioned above, the filter itself may be followed by the proper design of a potentinometer. This design may call for capacitor and inductor elements combined into the switch sections together with the proper loading impedance required by the filter. For applications 5, 7 and 8 the filter itself would be designed to be incorporated into a switching mechanism as described in this invention, and illustrated in FIG. 11.

Figure 12:
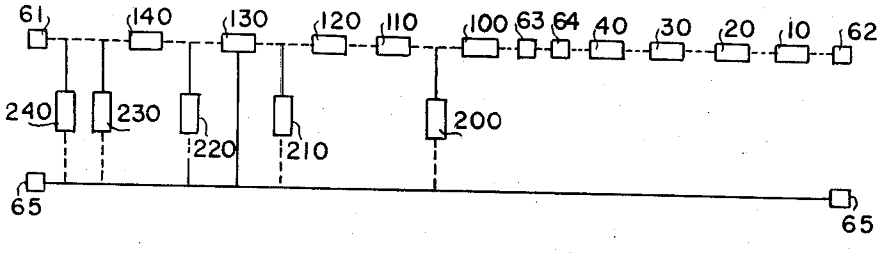
FIG. 12 is a specific equivalent circuit for an embodiment of the invention, showing by the dotted lines, selectivity for various networks effected by the switch assembly.

Let us return now to FIG. 11. It has been designed for 5 steps of attenuation. The zero position of the switch uses impedance elements 30 and 40 which serve to adjust the filter to, let us say, a 600 ohm level. The two other sections, 10 and 20, are also impedance values which are used to adjust the filter to the proper impedance. These four impedance elements are employed after the manner of resistances in potentiometers as in FIG. 1. Input and output terminals are 60 and 62 with a common terminal 65. These are shown specifically in FIG. 12. Note here that input terminal 60 is shown at 61. Terminals 63 and 64 are "TO" and "FROM" terminals in the previous potentiometer diagrams. In some applications, terminals 63 and 64 will be connected together, if it is not required that they be isolated.

It is to be noted in FIG. 11 that for each switch position there are, in general, two kinds of connections, the series circuit connections, referred to as the 100 series, as well as a common or mutual electrical interconnection for the parallel sections designated as the 200 series networks. These connections, of course, are made accordingly as each particular application may require. Switch contacts also, will be as numerous as required to give isolation both to terminals and impedance networks.

Figure 13:
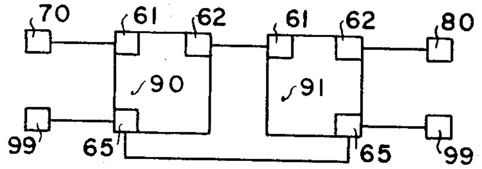
FIG. 13 is another circuit showing how two elemental attenuator sections, after the pattern of FIG. 11, may be interconnected.

FIG. 13 shows how the sections of FIG. 11 may be interconnected for a single attenuator. In general, these two units, 90 and 91, would require networks (as shown by FIG. 11) which are computer calculated; additional units might be ganged together, in which case, since they function interdependently, their impedances could only be determined with computer analysis.

Additional samples of attenuation sections are found in FIGS. 14, 15 and 16. It will be noted that slide contact 73 is shown between terminals 70 and 80 after the fashion of the potentiometer sections already deescribed as in FIG. 6. It will be noted that all parallel impedance units, whether of capacitor, inductor, or resistance type, may be connected each into its own switch assembly and then, in turn, interconnected at terminal 99 to serve, together with terminal 73 as an output terminal. FIG. 17 shows how three of these units may be interconnected.

FIG. 18A exemplies a quartal (base 4) counting system using a four-position switch. It is designed as a "half-potentiometer" and is therefore a simple two-terminal inductance network. FIG. 18B shows how two of these units may be connected together between input and output terminals. FIG. 18C is an equivalent circuit for either FIG. 18A or 18B. It is evident how such an inductance or resistance network could be designed for any counting system, such as the decimal system.

FIG. 19A shows how a quartal counting system with a four-position switch is adapted for use with a capacitor system in capacitor network which we might call a "half-potentiometer." FIG. 19B demonstrates the interconnection of two such units between input and output terminals. FIG. 19C is an equivalent circuit for FIG. 19A or 19B. It will be noted that for both of these "half-potentiometers" there is required only one series circuit for each switch position and in the case of the capacitor network, two main terminal connections suffice for a polarized group of capacitors, unlike the capacitor potentiometer system where, in general, three main terminal connections are required for each switch position. It is clear how such a capacitor network may be applied to any counting system.

In general, an improvement afforded by this invention is that for manual control of the potentiometer a multiple pole, double or multiple position switch may be employed, as is common in the rotary or push button types. The number of poles required depends upon the number of switch closures at each position, whereas the number of switch positions depends upon the base of the counting system employed.

For example, FIG. 1 shows a minimum resistance potentiometer for a decimal system. One might employ nine resistors with ratio values from 1 to 9. Such an arrangement would require only a 2-pole, 10-position switch, as a resistance box, or a "half-potentiometer" application, employing the minimum number of resistances; or a 4-pole, 10-position switch as a decimal divider potentiometer with the minimum number of resistances; or an 11-pole, 10-position switch as a potentiometer with the maximum number of resistances. Now one could even introduce more than 9 resistors into such a system. Hence, many variations are possible and intended to be the object of this present invention.

FIG. 20 shows the manner in which a digital voltmeter or ohmmeter can be constructed using the impedance potentiometers already described. In such an application, one desires automatic operation. Therefore, manual switching is replaced with relay or solid state devices. Referring now to FIG. 20, an impedance potentiometer 200, made of five elemental potentiometers, 201 through 205, together with terminals 61, 62 and 73 are shown. An adjustable power supply 100 is connected to the impedance potentiometer terminals and across the potentiometer is placed an unknown potential 103 which is to be measured. It is connected through a null indicator 102 which is capable of controlling pulse generator 101.

The pulse generator 101 drives a counter indicated in digital form at 301 through 305. This counter switches the contacts attached to the impedances either by relays or by solid state device methods in exactly the same fashion as manual switching in FIG. 1 switches the ganged contacts for each digital position.

Connections 111 through 115 indicate how the elemental potentiometer is made to follow the digital counter.

Initially, the bucking potential applied across the unknown 103, supplied by the potentiometer 202 is zero but as the pulse generator 101 drives the counter and that in turn drives the potentiometer, the output voltage increases. The null indicator 102 indicates when the two voltages from 200 and 103 are equal and opposite and at that point stops the pulse generator 101 through connection 108.

The display device is so connected to either the potentiometer 202 or to the counter 301 through 305, as shown, so that the resistance values of the potentiometer are continuously displayed. At null this value also indicate the unknown voltage.

What is claimed is:

1. A resistive network useful for counting and comprising as a unit a switch member having a first terminal, a second terminal, a third terminal and a fourth terminal, a resistance, said switch having common ganged movable contact means for connecting said resistance and said terminals, said switch capable of being positioned so that the first terminal connects with the third terminal and the fourth terminal connects with the second terminal by means of the resistance; said switch capable of being positioned so that the first terminal connects with the third terminal by means of the resistance, and the fourth terminal connects with the second terminal; said third and fourth terminals upon being connected function as the slide of a potentiometer; and, said third and fourth terminals may be connected to function as a single terminal.

2. A resistive network according to claim 1 and comprising said switch having a first pair of contacts, a second pair of contacts, a third pair of contacts, a fourth pair of contacts, a fifth pair of contacts and a sixth pair of contacts; each said contact pair being composed of one fixed and one common movable contact, said switch capable of being positioned so that the first terminal connects with the third terminal through the first pair of contacts, the third terminal connects with the fourth terminal, and the fourth terminal connects with the second terminal by means of the second pair of contacts, the resistance, and the third pair of contacts; and, said switch capable of being positioned so that the first terminal connects with the third terminal by means of the fourth pair of contacts, the resistance and the fifth pair of contacts, the third terminal connects with the fourth terminal, and the fourth terminal connects with the second terminal by means of the sixth pair of contacts.

3. A resistive network according to claim 1 and comprising a plurality of said units of claim 1 and comprising a first unit and a second unit, the third terminal of the first unit connecting to the first terminal of the second unit, and the second terminal of the second unit connecting with the fourth terminal of the first unit.

4. A resistive network according to claim 2 and comprising a plurality of said units of claim 2 and comprising a first unit and a second unit, the third terminal of the first unit connecting to the first terminal of the second unit, and the second terminal of the second unit connecting with the fourth terminal of the first unit.

5. A resistive network according to claim 1 and comprising a first resistance and a second resistance, said switch capable of being positioned so that the first terminal connects with the third terminal, and the fourth terminal connects with the second terminal by means of the first resistance and the second resistance; said switch capable of being positioned so that the first terminal connects with the third terminal by means of the first resistance, and the fourth terminal connects with the second terminal by means of the second resistance; said switch capable of being positioned so that the first terminal connects with the third terminal by means of the first resistance and by means of the second resistance, and the fourth terminal connects with the second terminal.

6. A resistive netork according to claim 1 and comprising a first resistance, a second resistance and a third resistance, said switch capable of being positioned so that the first terminal connects with the third terminal and the fourth terminal connects with the second terminal by means of said three resistances; said switch capable of being positioned so that the first terminal connects with the third terminal by means of one of the three resistances, and the fourth terminal connects with the second terminal by means of two of the three resistances; said switch capable of being positioned so that the first terminal connects with the third terminal by means of two of the three resistances, and the fourth terminal connects with the second terminal by means of one of the resistances; and, said switch capable of being positioned so that the first terminal connects with the third terminal by means of said three resistances, and the fourth terminal connects with the second terminal.

7. A resistive network according to claim 1 and comprising a first resistance, a second resistance, a third resistance and a fourth resistance, said switch capable of being positioned so that the first terminal connects with the third terminal, and the fourth terminal connects with the second terminal by means of said four resistances; said switch capable of being positioned so that the first terminal connects with the third terminal by means of one of said resistances, and the fourth terminal connects with the second terminal by means of the remaining three said resistances; said switch capable of being positioned so that the first terminal connects with the third terminal by means of two of said resistances, and the fourth terminal connects with the second terminal by means of two of the remaining said resistances; said switch capable of being positioned so that the first terminal connects with the third terminal by means of three of said resistances, and the fourth terminal connects with the second terminal by means of one of the remaining said resistances; and, said switch cabable of being positioned so that the first terminal connects with the third terminal by means of said four resistances and the fourth terminal connects with the second terminal.

8. A resistive network according to claim 1 and comprising $n$ number of resistances, said switch capable of being positioned in a zero position so that the first terminal connects with the third terminal, and the fourth terminal connects with the second terminal by means of said $n$-number of resistances; said switch capable of being positioned in a first position so that the first terminal connects with the third terminal by means of one of said resistances, and the fourth terminal connects with the second terminal by means of $(n-1)$ number of said resistances; and said switch capable of being positioned in a numbered position so that the first terminal connects with the third terminal by means of the number of said resistances corresponding to the number of the switch position, and the fourth terminal connects with the second terminal by means of the ($n$-number of switch positions) resistances.

9. An inductive network useful for counting and comprising as a unit a switch member having a first terminal, a second terminal, a third terminal and a fourth terminal, an inductance, said switch having common ganged movable contact means for connecting said terminals and said inductance, said switch capable of being positioned so that the first terminal connects with the third terminal and the fourth terminal connects with the second terminal by means of the inductance; said switch capable of being positioned so that the first terminal connects with the third terminal by means of the inductance, and the fourth terminal connects with the second terminal; said third and fourth terminals upon being connected function as the slide of a potentiometer; and, said third and fourth terminals may be connected to function as a single terminal.

10. An inductive network according to claim 9 and comprising said switch having a first pair of contacts, a second pair of contacts, a third pair of contacts, a fourth pair of contacts, a fifth pair of contacts and a sixth pair of contacts; each said contact pair being composed of one fixed and one common, movable contact, said switch capable of being positioned so that the first terminal connects with the third terminal through the first pair of contacts, the third terminal connects with the fourth terminal, and the fourth terminal connects with the second terminal by means of the second pair of contacts, the inductance, and the third pair of contacts; and, said switch capable of being positioned so that the first terminal connects with the third terminal by means of the forth pair of contacts, the inductance and the fifth pair of contacts, the third terminal connects with the fourth terminal, and the fourth terminal connects with the second terminal by means of the sixth pair of contacts.

11. An inductive network according to claim 9 and comprising a plurality of said units of claim 9 and comprising a first unit and a second unit, the third terminal of the first unit connecting to the first terminal of the second unit, and the second terminal of the second unit connecting with the fourth terminal of the first unit.

12. An inductive network according to claim 10 and comprising a pulrality of said units of claim 10 and comprising a first unit and a second unit, the third terminal of the first unit connecting to the first terminal of the second unit, and the second terminal of the second unit connecting with the fourth terminal of the first unit.

13. An inductive network according to claim 9 and comprising a first inductance and a second inductance, said switch capable of being positioned so that the first terminal connects with the third terminal, and the fourth terminal connects with the second terminal by means of the first inductance and the second inductance; said switch capable of being positioned so that the first terminal connects with the third terminal by means of the first inductance, and the fourth terminal connects with the second terminal by means of the second inductance; said switch capable of being positioned so that the first terminal connects with the third terminal by means of the first inductance and by means of the second inductance, and the fourth terminal connects with the second terminal.

14. An inductive network according to claim 9 and comprising a first inductance, a second inductance and a third inductance, said switch capable of being positioned so that the first terminal connects with the third terminal and the fourth terminal connects with the second terminal by means of said three resistances; said switch capable of being positioned so that the first terminal connects with the third terminal by means of one of the three inductances, and the fourth terminal connects with the second terminal by means of two of the three inductances; said switch capable of being positioned so that the first terminal connects with the third terminal by means of two of the three inductances, and the fourth terminal connects with the second terminal by means of one of the inductances; and, said switch capable of being positioned so that the first terminal connects with the third terminal by means of said three inductances, and the fourth terminal connects with the second terminal.

15. An inductive network according to claim 9 and comprising a first inductance, a second inductance, a third inductance and a fourth inductance, said switch capable of being positioned so that the first terminal connects with the third terminal, and the fourth terminal connects with the second terminal by means of said four inductances, said switch capable of being positioned so that the first terminal connects with the third terminal by means of one of said inductances, and the fourth terminal connects with the second terminal by means of the remaining three said inductances; said switch capable of being positioned so that the first terminal connects with the third terminal by means of two of said inductances, and the fourth terminal connects with the second terminal by means of two of the remaining said inductances; said switch capable of being positioned so that the first terminal connects with the third terminal by means of three of said inductances, and the fourth terminal connects with the second terminal by means of one of the remaining said inductances; and, said switch capable of being positioned so that the first terminal connects with the third terminal by means of said four inductances and the fourth terminal connects with the second terminal.

16. An inductive network according to claim 9 and comprising *n*-number of inductances, said switch capable of being positioned in a number zero position so that the first terminal connects with the third terminal, and the fourth terminal connects with the second terminal by means of said *n*-number of inductances; said switch capable of being positioned in a number one position so that the first terminal connects with the third terminal by means of one of said inductances, and the fourth terminal connects with the second terminal by means of (*n*-number of the switch position) of the remaining said inductances; and, repeating said switch position so that the first terminal connects with the third terminal by the number of inductances corresponding to the number of the switch position and the fourth terminal connects with the second terminal by (*n*-number of switch position) of the remaining said inductances.

17. A capacitive network comprising:
(a) a switch member;
(b) a first terminal;
(c) a second terminal;
(d) a third terminal;
(e) a capacitance;
(f) said switch member having common, movable contact means for connecting said capacitance and said terminals;
(g) said switch member capable of being positioned so that said second terminal and said third terminal connect with said capacitance;
(h) said switch member capable of being positioned so that said first terminal and said third terminal connect with said capacitance; and
(i) said third terminal functioning as a slide of a potentiometer.

18. A capacitive network according to claim 17 and comprising:
(a) a first pair of contacts;
(b) a second pair of contacts;
(c) each said contact pair being composed of one fixed and one common, movable contact;
(d) said second terminal and said third terminal connecting by means of said capacitance and said second pair of contacts; and,
(e) said first terminal and said third terminal connecting by means of said capacitance and said first pair of contacts.

19. A capacitive network according to claim 17 and comprising:
(a) said capacitance being a polarized capacitance;
(b) a first pair of contacts;
(c) a second pair of contacts;
(d) a third pair of contacts;
(e) a fourth pair of contacts;
(f) each said contact pair being composed of one fixed and one common, movable contact;
(g) with said switch member being in one position said second terminal connects with the capacitance by means of the second pair of contacts and said third terminal connects with the capacitance by means of the first pair of contacts; and,
(h) with said switch member in another position said first terminal connects with the capacitance by means of the third pair of contacts and said third terminal connects with the capacitance by means of the fourth pair of contacts.

20. A capacitive network according to claim 17 and comprising:
(a) a first capacitance and a second capacitance;
(b) with said switch member in a first position said second terminal connecting with one side of the first capacitance and with one side of the second capacitance, and said third terminal connecting with the other side of the first capacitance and with the other side of the second capacitance;

(c) with said switch member in a second position said first terminal connecting with one side of the first capacitance and said third terminal connecting with the other side of the first capacitance, and said second terminal connecting with one side of the second capacitance and said third terminal connecting with the other side of the second capacitance;

(d) with said switch member in a third position said first terminal connects with one side of the second capacitance and the other side of the second capacitance connects with both the third terminal and with one side of the first capacitance, and the other side of the first capacitance connects with the second terminal; and, (e) with said switch member in a fourth position said first terminal connects with one side of the second capacitance and with one side of the first capacitance, and the other side of the second capacitance connects with the third terminal and the other side of the first capacitance connects with the third terminal.

21. A capacitive network according to claim 17 and comprising:

(a) a first capacitance, a second capacitance, and a third capacitance;

(b) with said switch member in a first position, said second terminal connecting with one side of each of said three capacitances and said third terminal connecting with the other side of each of said three capacitances;

(c) with said switch member in a second position said first terminal connecting with one side of one of said capacitances and said third terminal connecting with the other side of said same capacitance, and said second terminal connecting with one side of the remaining said two capacitances and said third terminal connecting with the other side of the remaining said two capacitances;

(d) with said switch member in a third position said first terminal connecting with one side of said two capacitances and said third terminal connecting with the other side of said two capacitances, and said second terminal connecting with one side of the remaining said capacitance and the third terminal connecting with the other side of the remaining said capacitance; and, (e) with said switch member in a fourth position said first terminal connecting with one side of said three capacitances and said third terminal connecting with the other side of said three capacitances.

22. A capacitive network according to claim 17 and comprising:

(a) a first capacitance, a second capacitance, a third capacitance and a fourth capacitance;

(b) with said switch member in a first position, said second terminal connecting with one side of said four capacitances and said third terminal connecting with the other side of said four capacitances;

(c) with said switch member in a second position said first terminal connecting with one side of one capacitance and said terminal connecting with the other side of said one capacitance, and said second terminal connecting with one side of the remaining said three capacitances and the third terminal connecting with the other side of the remaining said three capacitances;

(d) with said switch member in a third position said first terminal connecting with one side of two of said capacitances and the third terminal connecting with the other side of said two capacitances, and a second terminal connecting with one side of the remaining said two capacitances and the third terminal connecting with the other side of the remaining said two capacitances;

(e) with said switch member in a fourth position the first terminal connecting with one side of said three capacitances and the third terminal connecting with the other side of said three capacitances, and the second terminal connecting with one side of the remaining fourth capacitance and the third terminal connecting with the other side of the remaining said fourth capacitance; and, (f) with the switch member in a fifth position said first terminal connecting with one side of said four capacitances and the third terminal connecting with the other side of said four capacitances.

23. A capacitive network according to claim 17 and comprising:

(a) there being an indefinite number of capacitances represented by the letter $n$;

(b) with said switch member in a zero position said second terminal connecting with one side of all of said $n$-capacitances and the third terminal connecting with the other side of all of said $n$-capacitances;

(c) with said switch member in a first position said second terminal connecting with one side of $(n-1)$ of said capacitances and the third terminal connecting with the other side of $(n-1)$ of said capacitances, and the first terminal connecting with one side of the remaining one said capacitance and the third terminal connecting with the other side of said one said remaining capacitance; and, (d) with the switch member in another numbered position, then said second terminal connects with one side of $(n-1)$ numbered position of said capacitances and the third terminal connecting with the other side of $(n-1)$ numbered position of said capacitances, and said first terminal connecting with the one side of the numbered position of said capacitances and the third terminal connecting with the other side of the numbered position of said capacitances.

24. A resistance network comprising:

(a) a switch member having a first pair of power terminals comprising a first terminal and a second terminal;

(b) said switch member having a second pair of power terminals comprising a third terminal and a fourth terminal;

(c) four resistance means suitable for a numerical counting system;

(d) said switch member having ganged movable contacts for contacting said resistance means;

(e) said switch member being capable of being positioned in a number of positions;

(f) said switch member for said number of positions defining a first circuit between the first terminal and the third terminal and a second circuit between the fourth terminal and the second terminal with the number of resistances in the first circuit and the second circuit being equal to four;

(g) said four resistances being sufficient for a counting system from a base-nine counting system to a base-sixteen counting system;

(h) one of said first circuits in conjunction with said switch member capable of being used as a variable resistance; and, (i) said first circuit and said second circuit capable of being connected into a third circuit by connecting together the third and fourth terminals to form a three-terminal resistive potentiometer comprising said four resistance means.

25. A resistive network according to claim 24 wherein said first circuit and said second circuit together with a conventional potentiometer having a glider being connected into a new single circuit, the conventional potentiometer separating the said first and said second circuits, and a third terminal of this said newly formed potentiometer being the glider of the conventional potentiometer.

26. In combination in a resistance network;
(a) a resistance;
(b) switch member with at least two switch positions;
(c) four associated power terminals;
(d) said power terminals having one contact for each of said two switch positions;
(e) said resistance having two electrical contacts at each end and one contact for each of two said switch positions;
(f) switch selection means including ganged movable contacts capable of engaging said power terminals and said resistive element in a first and second series circuit at each of said two switch positions;
(g) the first said series circuit containing the said resistive element in the second said switch position but not in the first said switch position;
(h) the second said series circuit containing the said resistive element in the first switch position but not in the second switch position;
(i) the two non-joined terminals of the said joined series circuit forming the end terminals of a newly formed three terminal potentiometer; and,
(j) the joined terminals of said joined series circuit serving as the said third terminal and slide of the said newly formed three terminal potentiometer.

27. In combination in an inductive network:
(a) an inductance;
(b) switch member with at least two switch positions;
(c) four associated power terminals;
(d) said power terminals having one contact for each of said two switch positions;
(e) said inductance having two electrical contacts at each end and one contact for each of two said switch positions;
(f) switch selection means including ganged movable contacts capable of engaging said power terminals and said inductive element in a first and second series circuit at each of said two switch positions;
(g) the first said series circuit containing the said inductive element in the second said switch position but not in the first said switch position;
(h) the second said series circuit containing the said inductive element in the first switch position but not in the second switch position;
(i) the two non-joined terminals of the said joined series circuits forming the end terminals of a newly formed three terminal potentiometer; and,
(j) the joined terminals of said joined series circuit serving as the said third terminal and slide of the said newly formed three terminal potentiometer.

28. An inductive network comprising:
(a) a switch member having a first pair of power terminals comprising a first terminal and a second terminal;
(b) said switch member having a second pair of power terminals comprising a third terminal and a fourth terminal;
(c) four inductance means suitable for a numerical counting system;
(d) said switch member having common ganged movable contacts for contacting said inductance means;
(e) said switch member being capable of being positioned in a number of positions;
(f) said switch member for said number of positions defining a first circuit between the first terminal and the third terminal and a second circuit between the fourth terminal and the second terminal with the number of inductances in the first circuit and the second circuit being equal to four;
(g) said four inductances being sufficient for a counting system from a base-nine counting system to a base-sixteen counting system;
(h) one of said circuits in conjunction with said switch member capable of being used as a variable inductance; and,
(i) said first circuit and said second circuit capable of being connected into a third circuit by connecting together the third and fourth terminals to form a three-terminal inductive potentiometer comprising said four inductive means.

29. An inductive network according to claim 28 wherein said first circuit and said second circuit together with a conventional potentiometer having a glider being connected into a new single circuit, the conventional potentiometer separating said first and said second circuits, the third terminal of this said newly formed potentiometer being the glider of a conventional potentiometer.

30. A resistive potentiometer comprising a plurality of switch members, one or more resistances suitable for a numerical counting system for each said switch member, three main power terminals, two pair of power terminals for each said switch, said switch-associated power terminals having a plurality of electrical contacts equal to the base of the counting system, said switch-associated resistances having ratios suitably selected for counting through a span of numbers associated with and determined by the base of the particular counting system, groups of said switches including said switch-associated resistances capable of counting from a least significant group of said switch-associated resistances to the most significant group of said switch-associated resistances, each said resistance terminating at each end with one switch contact for each position of its associated switch, said switch members including switch selection means having common ganged movable contacts capable of making a number of switch associated closures equal to the number of switch-associated resistances plus two at each of a number of switch positions, said number of switch positions being equal to the base of the counting system, said resistance elements of each said switch member being associated at each said switch position in either of one of two circuit connections through common movable contact closures of each switch member, a first of these two said circuits contain between one pair of power terminals at each said switch position the number of said resistances required so that the resistance ratio will correspond numerically to the counting position on the switch, said second circuit comprising simultaneously at the same switch position whatever said switch-associated resistances belonging to a given switch are not included in said first circuit, said first circuits from all said switch members from said most significant to said least significant being joined into a new longer first circuit and said second circuits from all said switch members from the most significant to the least significant being joined into a new longer second circuit, said two longer circuits being joined into one final circuit to form said resistive potentiometer, said connection means serving as the slide contact, the three said main power terminals being connected to the said slide contact and to the two ends of the said final series circuit.

31. A resistive potentiometer according to claim 30 and comprising:
(a) the numerical lowest group of said switch-associated resistances being associated with the least significant switch member, the succeeding next numerically lowest group of said switch-associated resistances being associated with next to the said least significant switch member, the third group of said switch-associated resistances being associated with the third from the said least significant switch member, and thus up to the most significant group of said switch-associated resistances which are associated with the most significant switch member.

32. A resistance network according to claim 30 and comprising:
(a) a plurality of resistance elements for each of said switch members;
(b) also four power terminals for each switch member;
(c) each said switch member containing at least a number of switch positions equal to the base of the counting system;
(d) a counting system of bases three and four, inclusive, and having at least two said resistances per said switch member;
(e) a counting system of bases five to eight, inclusive, and having at least three said resistances per said switch member;
(f) a counting system of bases nine to sixteen, inclusive, and having at least four said resistance elements per said switch member; and
(g) a counting system of bases seventeen to thirty-two and having at least five resistance elements per switch member.

33. A resistive potentiometer according to claim 30 and comprising:
(a) a plurality of main power terminals in addition to said three main power terminals;
(b) one said additional main power terminal being connected to each connection between connected switch members; and,
(c) said intermediate main terminals between the original two main power terminals at either end of the entire series circuit serving as multislides with limited contact.

34. A resistive potentiometer network according to claim 30 and comprising:
(a) a conventional resistive potentiometer between the two said connected longer series circuits;
(b) said conventional potentiometer having a glider; and,
(c) said third main terminal being connected to said glider to serve as the main slide of the potentiometer formed from the said two longer series circuits and said conventional potentiometer.

35. In a resistive network potentiometer according to claim 30 and comprising:
(a) two or more elemental resistive potentiometers;
(b) three main power terminals including a main "IN" and a main "OUT" terminal;
(c) a selector switch connecting to said main "IN" and main "OUT" terminals;
(d) said elemental resistive potentiometers so joined together as to constitute a long potentiometer; and,
(e) each said elemental resistive potentiometer being connected to said selector switch in such wise that the main power terminals can be selectively connected to any said elemental resistive potentiometer and thereby selectively altering the total impedance across the main terminals and with the slide terminal always connected to said third main power terminal.

36. In a resistive potentiometer according to claim 30 and comprising:
(a) said counting system being arranged for useful counting and to include continuous counting and to include counting by twos, threes, and any other counting increment.

37. An inductive potentiometer comprising a plurality of switch members, one or more inductances suitable for a numerical counting system for each said switch member, three main power terminals, two pair of power terminals for each said switch, said switch-associated power terminals having a plurality of electrical contacts equal to the base of the counting system, said switch-associated inductances having ratios suitably selected for counting through a span of numbers associated with and determined by the base of the particular counting system, groups of said switches including said switch-associated inductances capable of counting from a least significant group of said switch-associated inductances to the most significant group of said switch-associated inductances, each said inductance terminating at each end with one switch contact for each position of its associated switch, said switch members including switch selection means having common ganged movable contacts capable of making a number of contact closures equal to the number of switch-associated inductances plus two at each of a number of switch positions, said number of switch positions being equal to the base of the counting system, said inductance elements of each said switch member being associated at each said switch position in either of one of two circuit connections through common movable contact closures of each switch member, a first of these two said circuits containing between one pair of power terminals at each said switch position the number of said inductances required so that the inductance ratio will correspond numerically to the counting position on the switch, said second circuit comprising simultaneously at the same switch position whatever said switch-associated inductances belonging to a given switch are not included in said first circuit, said first circuits from all said switch members from said most significant to said least significant being joined into a new longer first circuit and said second circuits from all said switch members from the most significant to the least significant being joined into a new longer second circuit, said two longer circuits being joined into one final circuit to form said inductive potentiometer, said connection means serving as the slide contact, the three said main power terminals being connected to the said slide contact and to the two ends of the said final series circuit.

38. An inductive potentiometer according to claim 37 and comprising:
(a) the numerical lowest group of said switch-associated inductances being associated with the least significant switch member, the succeeding next numerically lowest group of said switch-associated inductances being associated with next to the said least significant switch member, the third group of said switch-associated inductances being associated with the third from the said least significant switch member, and thus up to the most significant group of said switch-associated inductances which are associated with the most significant switch member.

39. An inductive network according to claim 37 and comprising:
(a) a plurality of inductive elements for each of said switch members;
(b) also four power terminals for each switch members;
(c) each said switch member containing at least a number of switch positions equal to the base of the counting system;
(d) a counting system of bases three and four, inclusive, and having at least two said inductances for said switch member;
(e) a counting system of bases five to eight, inclusive, and having at least three said inductances per said switch member;
(f) a counting system of bases nine to sixteen, inclusive, and having at least four said inductance elements per said switch member; and,
(g) a counting system of bases seventeen to thirty-two and having at least five inductance elements per switch member.

40. An inductive potentiometer network according to claim 37 and comprising:
(a) a plurality of main power terminals in addition to said three main power terminals;
(b) one said additional main power terminal being connected to each connection between connected switch members;
(c) said intermediate main terminals between the original two main power terminals at either end of the entire series circuit serving as multislides with limited contact;

(d) said interconnection of said two longer series circuits being effected by means of a variable inductance with mechanical glider; and, (e) said mechanical glider capable of serving as main slide of new inductive potentiometer.

41. In an inductive network potentiometer according to claim 37 and comprising:

(a) two or more elemental inductive potentiometers;

(b) three main power terminals including a main "IN" and a main "OUT" terminal;

(c) a selector switch connecting to said main "IN" and said main "OUT" terminals;

(d) said elemental inductive potentiometers so joined together as to constitute a long inductive potentiometer; and, (e) each said elemental inductive potentiometer being connected to said selector switch in such a way that the main power terminals can be selectively connected to any said elemental inductive potentiometer and thereby selectively alter the total impedance across the main terminals and with the slide terminal always connected to said third main power terminal.

42. An inductive potentiometer network according to claim 37 and comprising:

(a) said counting system being arranged for useful counting and to include continuous counting and to include counting by twos, threes, and any other counting increment.

43. In a capacitive potentiometer comprising one or a plurality of switch members, one or more capacitances suitable for a numerical counting system for each said switch member, three main power terminals, and in addition, a pair of power terminals and a common power terminal for each said switch, said pair of switch-associated power terminals having a plurality of electrical contacts equal to the base of the counting system, said switch-associated capacitances having ratios suitably selected for counting through a span of numbers associated with and determined by the base of the particular counting system; groups of said switches, including said switch-associated capacitances capable of counting from a least significant group of said switch-associated capacitances to the most significant group of said switch-associated capacitances; each said capacitance element being terminated at one end with a plurality of switch contacts equal to the base of the counting system, one for each position of its own said switch, the other end being permanently connected with all other capacitances of its switch member, said switch members including switch selection means having common ganged movable contacts capable of making at each switch position a number of contact closures equal to the number of switch-associated capacitances, the number of switch positions being equal to the base of the counting system, the said capacitance elements at each said switch member being associated at each said switch position in either of two switch-contact-associated power terminal connections; a first connection will connect one said switch-associated power terminal to none or one or a plurality of capacitances at each said switch position in such a manner that counting may be maintained for successive switch positions, that is, the sum of the capacitance ratios of the connected capacitances is made numerically equal to the value of the switch position which switch position ranges from zero up to one less than the number equal to the base of the counting system employed, said second power terminal connection will simultaneously connect at each said switch position whatever said switch-associated capacitive elements are not connected in the said first power terminal connection or with none of the said switch-associated capacitances belonging to a given switch if all have a connection at the first said power terminal connection, said third power terminal serving as a common connection for all capacitance elements; the first said main power terminal being connected to the first said power terminal of each said switch member, the second main power terminal being connected to the second main power terminal of each said switch member, the third main power terminal being connected to the common power terminal connection of the capacitive elements thus forming a capacitive potentiometer, and where the equivalent "slide" contact is the said third main power terminal.

44. A capacitive network according to claim 43 and comprising:

(a) a switch member having a first terminal, a second terminal and a third terminal;

(b) said first terminal having a plurality of electrical contacts;

(c) said second terminal having a plurality of electrical contacts;

(d) four capacitance means suitable for a continuous numerical counting system;

(e) each of said capacitances having at a first end a plurality of possible contacts for various positions of said switch member;

(f) each of said capacitances having a second end being electrically connected together and attached to said third terminal for a permanent common connection;

(g) said switch member including ganged movable contacts capable of making common connection for each switch position of said first terminal with said capacitive elements so as to obtain useful counting ratios of said capacitance values in a first mutual electrical connection and said capacitive elements may vary from zero through four;

(h) said first mutual electrical connection being made to that end of said capacitances not connected to said third terminal;

(i) means simultaneously for the positions of said switch member in a second mutual electrical connection to make contact between said second terminal and any of said capacitances whose said ends are not engaged in the first mutual electrical connection at that switch position;

(j) said switch comprising a sufficient numerical number of positions to accommodate a counting system of base nine through base sixteen;

(k) one of said first and second terminals together with the third terminal capable of serving as a two-terminal variable capacitance; and (l) the first, second and third terminals capable of being employed as a capacitive potentiometer with said third terminal serving as a capacitive potentiometer slide.

45. In a capacitive network potentiometer according to claim 43 and comprising:

(a) two or more elemental capacitive potentiometers;

(b) three main power terminals including a main "IN" and a main "OUT" terminal;

(c) a selector switch for selectively isolating the "IN" and "OUT" terminals;

(d) in steps, starting with and isolating the most significant said capacitive elemental potentiometer, then isolating the next most significant capacitive elemental potentiometers, then isolating the third most significant capacitive elemental potentiometers, and so on until only the least significant capacitive elemental potentiometer is connected to the main "IN" and "OUT" terminals; and (e) the slide terminal always being connected to said third main power terminal.

46. In a capacitive network potentiometer according to claim 43 and comprising:

(a) said counting system being arranged for useful counting and to include continuous counting and to include counting by twos, threes, and any other counting increment.

47. A capacitive potentiometer network according to claim 43 and comprising:

(a) a plurality of capacitances;

(b) a switch member for each capacitance;

(c) said switch members having two switch positions and also three associated power terminals;

(d) the other end of said capacitances to have one switch contact for each switch position;

(e) the other two power terminals having one switch contact for each switch position;

(f) switch selection means capable of connecting one end of said capacitance to said second power terminals in a first switch position and to said first power terminal in the second switch position;

(g) the third said power terminal being permanently connected to the other end of the capacitance;

(h) three main power terminals;

(i) said first main power terminal connected to all first said power terminals of all said switch members;

(j) said second main power terminal connected to all second said power terminals of all said switch members;

(k) said third main power terminal connected to said third power terminal of all said switch members;

(l) said first and second said main power terminals serving as an input to a capacitive potentiometer;

(m) third main power terminal serving as a slide contact of a capacitive potentiometer; and, (n) said capacitances selected for binary counting.

48. A capacitance network according to claim 43 and comprising;

(a) a plurality of capacitance elements for each of said switch members;

(b) also three power terminals for each switch member;

(c) each said switch member containing at least a number of switch positions equal to the base of the counting system;

(d) a counting system of bases three and four, inclusive, and having at least two said capacitances per said switch member;

(e) a counting system of bases five to eight, inclusive, and having at least three said resistances per said switch member;

(f) a counting system of bases nine to sixteen, inclusive, and having at least four said capacitance elements per said switch member; and, (g) a counting system of bases seventeen to thirty-two and having at least five capacitance elements per switch member.

49. In a capacitive potentiometer comprising one or a plurality of switch members, one or more polarized capacitances suitable for a numerical counting system for each said switch member, three main power terminals, and in addition three switch-associated power terminals for each said switch, said switch-associated power terminals having a plurality of electrical contacts equal to the base of the counting system, said switch-associated capacitances having ratios suitably selected for counting through a span of numbers associated with and determined by the base of the particular counting system; groups of said switches, including said switch-associated capacitances capable of counting from a least significant group of switchi-associated capacitances to the most significant group of capacitances associated with the most significant switch, each said capacitance element being terminated at both ends with a plurality of switch contacts equal to the base of the counting system, one for each position of its own said switch, said switch members, including switch selection means having common, ganged, movable contacts capable of making at each switch position a number of contact closures equal to two times the number of switch-associated capacitances, the number of switch positions being equal to the base of the counting system, the said capacitance elements at each said switch member being associated at each said switch position in any one of three switch-contact-associated power terminal connections; a first connection will connect one said switch-associated power terminal to none or one or a plurality of capacitances (always connecting together like polarities) at each said switch position in such a manner that counting may be maintained for successive switch positions, that is, the sum of the capacitance ratios of the connected capacitances is made numerically equal to the value of the switch position which switch position ranges from zero up to one less than the number equal to the base of the counting system employed, said second power terminal connection will simultaneously connect at each said switch position whatever said switch-associated capacitive elements are not connected in the said first power terminal connection or with none of the said switch-associated capacitances belonging to a given switch if all have a connection at the first said power terminal connection, said second power terminal connection being of opposite polarity to the first said power terminal connection, said third power terminal at each switch position serving as a common connection for whichever capacitance element end is not connected to either the first or second power terminal at each switch position, the first said main power terminal being connected to the first said power terminal of each said switch member, the second main power terminal being connected to the second main power terminal of each of said switch member, the third main power terminal being connected to the third said common power terminal connection of the capacitive elements of each said switch thus forming a capacitive potentiometer where the equivalent "slide" contact is the said third main power terminal.

50. A capacitive network according to claim 49 and comprising:

(a) a switch member having a first terminal, a second terminal and a third terminal;

(b) said first terminal having a plurality of electrical contacts;

(c) said second terminal having a plurality of electrical contacts;

(d) a number of electrolytic capacitance means suitable for a numerical counting system;

(e) each of said electrolytic capacitance means having a first positive end and a second negative end;

(f) at said first end a plurality of possible contacts for various positions of said switch member;

(g) at said second end a plurality of possible contacts for various positions of said switch member;

(h) said switch member including ganged movable common contacts capable of making mutual connection at each switch position between said first terminal and said electrolytic capacitance means so as to obtain useful counting ratios of capacitance ratio values in a first mutual electrical connection and said electrolytic capacitance means may vary from zero through four;

(i) means simultaneously for the positioning of said switch member in a second mutual electrical connection to make contact between said second terminal and said second end of any of said electrolytic capacitance means whose said first ends are not engaged in the first mutual electrical connection at that switch position;

(j) means simultaneously for the positioning of said switch member in a third mutual electrical connection to make contact between said third terminal and unconnected ends of said electrolytic capacitance means with all said first and second ends not engaged in the first mutual electrical connection and the second mutual electrical connection at that switch position;

(k) said switch comprising a sufficient numerical number of positions to accommodate any desired counting system;
(l) one of said first and second terminals together with the third terminal capable of serving as a two-terminal variable capacitance; and,
(m) the first, second third terminals capable of being employed as a capacitive potentiometer with said third terminal serving as a capacitive potentiometer slide.

51. A capacitive network according to claim 49 and comprising:
(a) a first main power terminal;
(b) a second main power terminal;
(c) a third main power terminal;
(d) a plurality of switch members with each switch member having a first terminal, and a second terminal and a third terminal;
(e) each said first terminal of each switch member having a plurality of electrical contacts, likewise;
(f) each said second terminal and said third terminal of each switch member having a plurality of electrical contacts;
(g) each said switch member having four capacitance means suitable for a numerical counting system;
(h) the plurality of said switch members and associated said capacitance means being capable of counting from a least significant said switch member to a most significant said switch member;
(i) the numerically lowest group of said four capacitances being associated with said least significant switch member;
(j) the succeeding next numerically lowest group of said four capacitances being associated with the next to said least significant switch member;
(k) in each said switch member from said least significant switch member to said most significant switch member said four capacitance elements having at both ends a plurality of contacts so as to have one contact for each position of its own switch;
(l) each said switch member including ganged movable contacts capable of making mutual connection at each switch position between said first terminal of said switch member and said capacitive elements so as to obtain useful counting ratios of said capacitance ratios values in a first mutual electrical connection and said capacitive elements may vary from zero through four;
(m) means for positioning simultaneously at each said switch position in a second mutual electrical connection between said second terminal of said switch member and any of said capacitances not engaged in said first mutual electrical connection at that switch position;
(n) said third switch terminal of each said switch being connected at each switch position to that end of each said capacitance not engaged in either said first or said second mutual electrical connection;
(o) said switch comprising a sufficient numerical number of positions to accommodate a counting system of base nine through base sixteen;
(p) said first terminal of each switch member being connected to said first main power terminal;
(q) said second terminal of each said switch member being connected to said second main power terminal;
(r) said third terminal of each said switch member being connected to said third main power terminal;
(s) said first and second main power terminals together with said switching means and the third said main power terminal serving as a capacitive potentiometer; and,
(t) said third main power terminal functioning as a slide for the said capacitive potentiometer.

52. A capacitive potentiometer network according to claim 49 and comprising:
(a) a plurality of capacitances;
(b) a switch member for each capacitance;
(c) said switch members having two switch positions and also three associated power terminals;
(d) said capacitances having one switch contact for each end at each switch position;
(e) each said power terminal having one switch contact for each switch position;
(f) switch selection means having common, movable contact means, capable of contacting at said first switch position said second power terminal with one end of said capacitance and the other end of said capacitance with third said power terminal;
(g) at second switch position said first power terminal with the end of the capacitance connected to the third said power terminal in said first switch position, and the third said power terminal with the end of the capacitance connected to the second said power terminal in said first switch position;
(h) three main power terminals;
(i) said first main power terminal connected to all first said power terminals of all said switch members;
(j) said second main power terminal connected to all second said power terminals of all said switch members;
(k) said third main terminal connected to said third power terminal of all said switch members;
(l) said first and second said main power terminals serving as an input to a capacitive potentiometer;
(m) third main power terminal serving as a slide contact of a capacitive potentiometer; and,
(n) said capacitances selected for a binary counting.

53. In a capacitive network potentiometer according to claim 49 and comprising:
(a) two or more elemental capacitive potentiometers;
(b) three main power terminals including a main "IN" and a main "OUT" terminal;
(c) a selector switch for selectively isolating the "IN" and "OUT" terminals;
(d) in steps, starting with and isolating the most significant said capacitive elemental potentiometer, then isolating the next most significant capacitive elemental potentiometer, then isolating the third most significant capacitive elemental potentiometers, and so on until only the least significant capacitive elemental potentiometer is connected to the main "IN" and "OUT" terminals; and,
(e) the slide terminal always being connected to said third main power terminal.

54. In a capacitive network potentiometer according to claim 49 and comprising:
(a) said counting system being arranged for useful counting and to include continuous counting and to include counting by twos, threes, and any other counting increment.

55. A capacitance network according to claim 49 and comprising:
(a) a plurality of capacitance elements for each of said switch members;
(b) also three power terminals for each switch member;
(c) each said switch member containing at least a number of switch positions equal to the base of the counting system;
(c) a counting system of bases three and four, inclusive, and having at least two said capacitances per said switch member;
(d) a counting system of bases five to eight, inclusive, and having at least three said capacitances per said switch member;
(f) a counting system of bases nine to sixteen, inclusive, and having at least four said capacitance elements per said switch member; and
(g) a counting system of bases seventeen to thirty-two and having at least five capacitance elements per switch member.

References Cited

UNITED STATES PATENTS

| | | | |
|---|---|---|---|
| 1,975,709 | 10/1934 | Blumlein | 333—81 |
| 2,894,197 | 7/1959 | Berry | 323—79 |
| 2,938,156 | 5/1960 | Smith | 323—74 |
| 2,954,518 | 9/1960 | Dugot | 323—74 |
| 2,999,202 | 9/1961 | Ule | 323—74 |
| 3,195,045 | 7/1965 | Ward | 324—62 |
| 3,252,080 | 5/1966 | Newbold et al. | 323—74 |
| 3,369,173 | 2/1968 | Andrews | 323—80 |

J D MILLER, Primary Examiner

G. GOLDBERG, Assistant Examiner

U.S. Cl. X.R.

323—77, 79, 80, 94; 324—62; 333—70, 81